(12) United States Patent
Muratani

(10) Patent No.: US 12,449,644 B2
(45) Date of Patent: Oct. 21, 2025

(54) ZOOM OPTICAL SYSTEM, OPTICAL APPARATUS AND METHOD FOR MANUFACTURING THE ZOOM OPTICAL SYSTEM

(71) Applicant: Nikon Corporation, Tokyo (JP)

(72) Inventor: Mami Muratani, Tokyo (JP)

(73) Assignee: Nikon Corporation, Tokyo (JP)

(*) Notice: Subject to any disclaimer, the term of this patent is extended or adjusted under 35 U.S.C. 154(b) by 709 days.

(21) Appl. No.: 17/638,803

(22) PCT Filed: Aug. 24, 2020

(86) PCT No.: PCT/JP2020/031788
§ 371 (c)(1),
(2) Date: Feb. 25, 2022

(87) PCT Pub. No.: WO2021/039697
PCT Pub. Date: Mar. 4, 2021

(65) Prior Publication Data
US 2022/0291490 A1   Sep. 15, 2022

(30) Foreign Application Priority Data

Aug. 29, 2019 (JP) ................ 2019-157408
Aug. 29, 2019 (JP) ................ 2019-157409

(51) Int. Cl.
*G02B 15/14* (2006.01)
*G02B 15/16* (2006.01)

(52) U.S. Cl.
CPC ......... *G02B 15/1461* (2019.08); *G02B 15/16* (2013.01)

(58) Field of Classification Search
CPC ............ G02B 15/1641; G02B 15/16
(Continued)

(56) References Cited

U.S. PATENT DOCUMENTS 5,241,421 A    8/1993 Endo et al.
2012/0154524 A1* 6/2012 Matsumura ............ G03B 17/17
                                            359/686
(Continued)

FOREIGN PATENT DOCUMENTS

CN   103837969 A   6/2014
JP   H03-225308 A  10/1991
(Continued)

OTHER PUBLICATIONS

Office Action issued Oct. 4, 2022, in Japanese Patent Application No. 2021-542876.
(Continued)

*Primary Examiner* — Sharrief I Broome
(74) *Attorney, Agent, or Firm* — Potomac Law Group, PLLC

(57) ABSTRACT

A variable magnification optical system having a front lens group and a rear lens group arranged in order from the object side along an optical axis, the rear lens group comprising a first focusing lens group and a second focusing lens group. When the magnification is changed, the spacing between lens groups adjacent to each other changes, at the time of changing from focusing on an object at infinity to focusing on an object at a short distance, the position of the front lens group is fixed, the first and second focusing lens groups move to the image surface side along different trajectories, and the conditional expression $0.05<(-fF2)/ft<0.50$ is satisfied, where fF2 is the focal length of the second focusing lens group, and ft is the focal length of the variable magnification optical system in a telephoto end state.

22 Claims, 32 Drawing Sheets

(58) Field of Classification Search
USPC .......................................................... 359/695
See application file for complete search history.

(56) References Cited

U.S. PATENT DOCUMENTS

| | | | |
|---|---|---|---|
| 2012/0243107 A1* | 9/2012 | Abe ..................... | G02B 15/177 |
| | | | 359/680 |
| 2013/0120640 A1* | 5/2013 | Taki .................... | G02B 15/1421 |
| | | | 359/684 |
| 2014/0139722 A1* | 5/2014 | Sugita ............ | G02B 15/145113 |
| | | | 359/684 |
| 2015/0226945 A1 | 8/2015 | Matsui et al. | |
| 2015/0277091 A1 | 10/2015 | Sugita | |
| 2017/0261728 A1 | 9/2017 | Shibata et al. | |
| 2018/0267280 A1 | 9/2018 | Shibata et al. | |
| 2018/0267281 A1 | 9/2018 | Shibata et al. | |
| 2019/0170989 A1 | 6/2019 | Shibata et al. | |
| 2019/0369371 A1 | 12/2019 | Katou et al. | |
| 2020/0049963 A1 | 2/2020 | Shibata et al. | |
| 2021/0096345 A1 | 4/2021 | Shibata et al. | |

FOREIGN PATENT DOCUMENTS

| | | |
|---|---|---|
| JP | 2013-178430 A | 9/2013 |
| JP | 2014-102462 A | 6/2014 |
| JP | 2015-152665 A | 8/2015 |
| JP | 2015-197593 A | 11/2015 |
| JP | 2017-219643 A | 12/2017 |
| WO | WO 2016/031256 A1 | 3/2016 |
| WO | WO 2018/139160 A1 | 8/2018 |

OTHER PUBLICATIONS

International Preliminary Report on Patentability for International Patent Application No. PCT/JP2020/031788, Mar. 10, 2022.
Office Action issued Dec. 13, 2022, in Japanese Patent Application No. 2021-542876.
International Search Report from International Patent Application No. PCT/JP2020/031788, Nov. 2, 2020.
Office Action issued May 5, 2023, in Chinese Patent Application No. 202080060100.7.

* cited by examiner

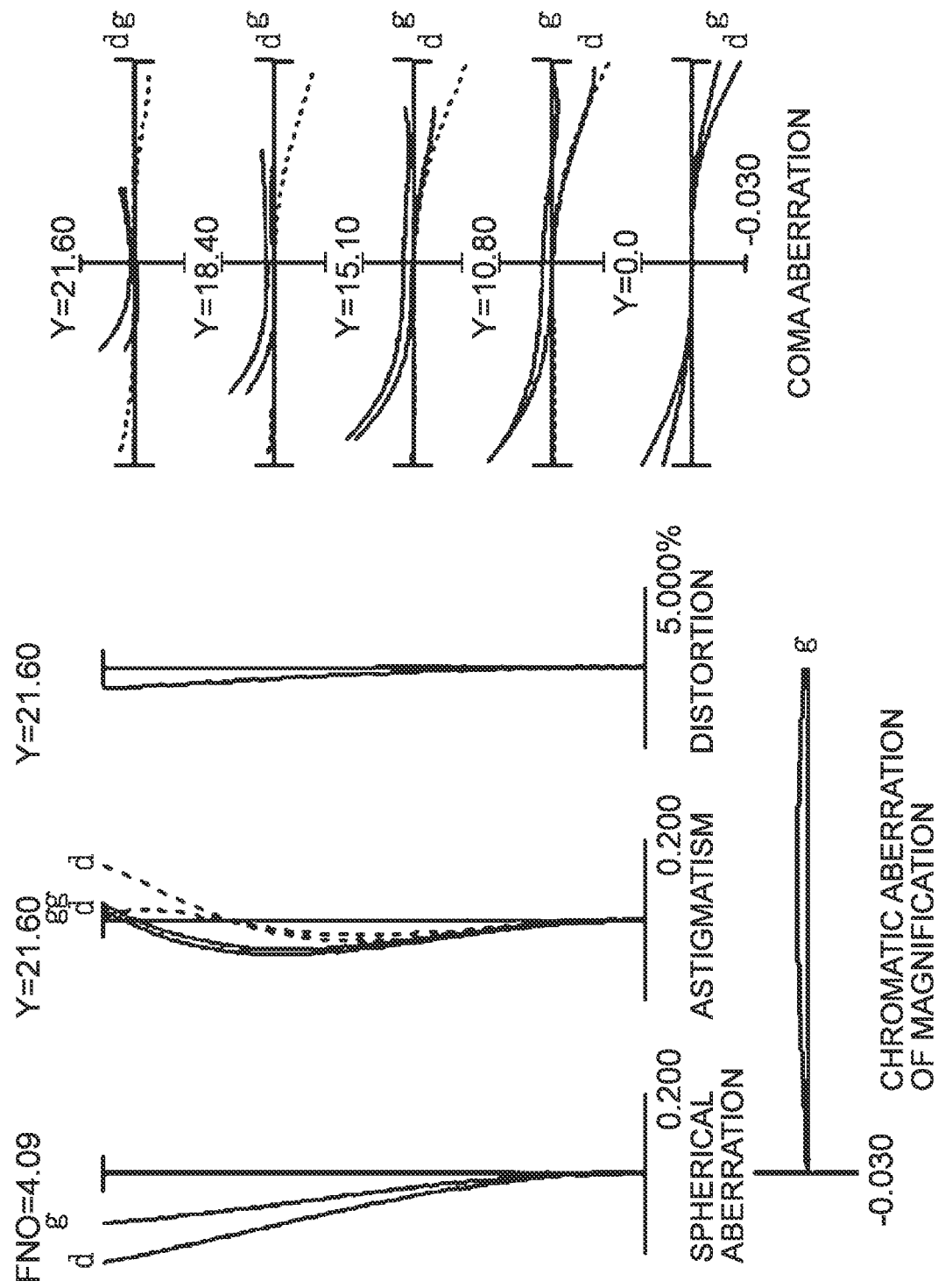

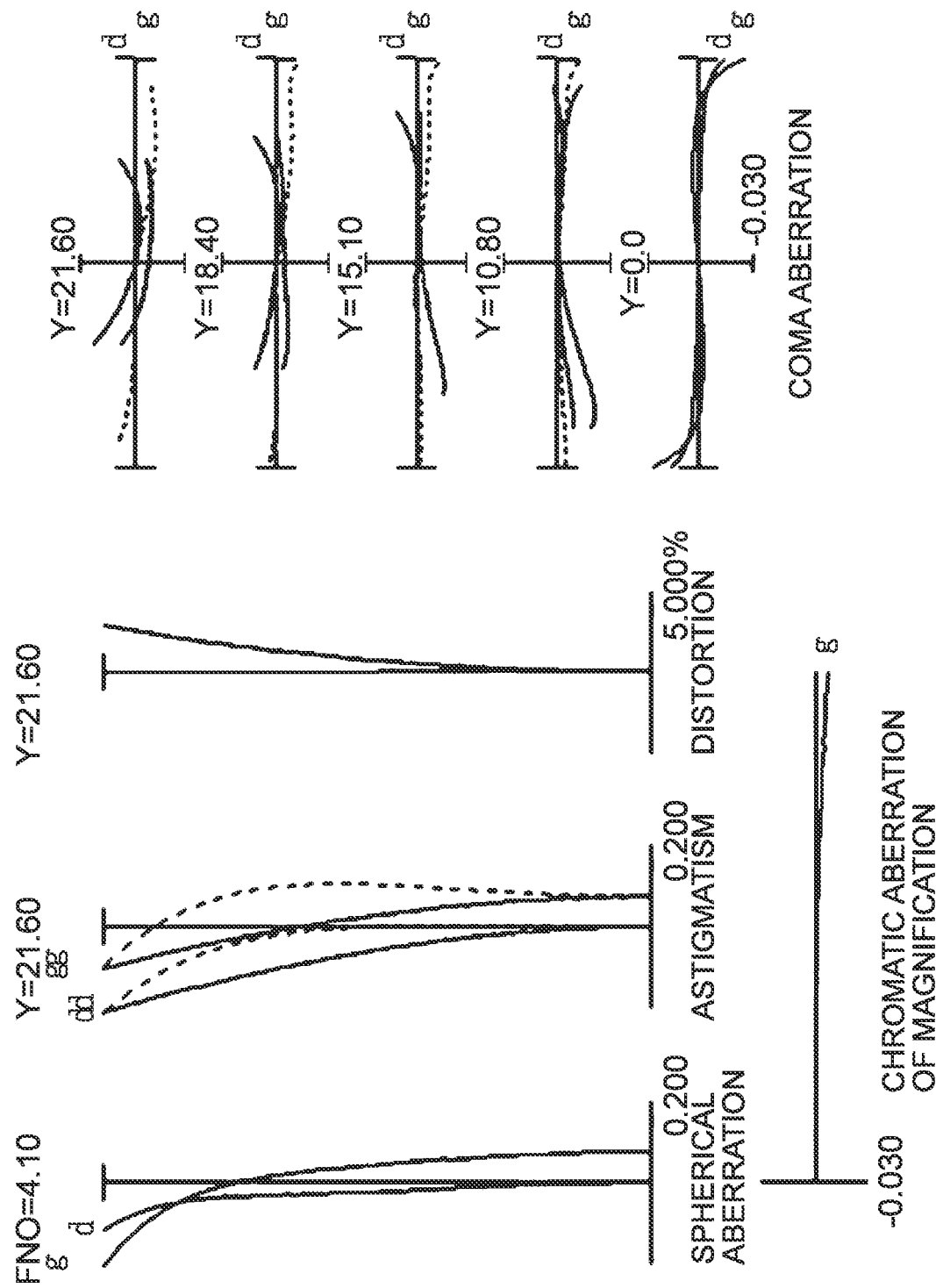

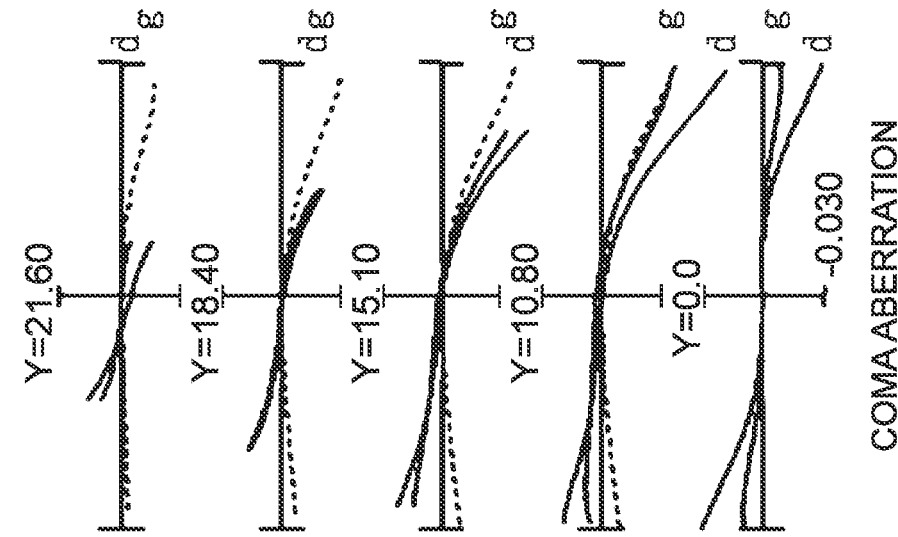
FIG. 3A
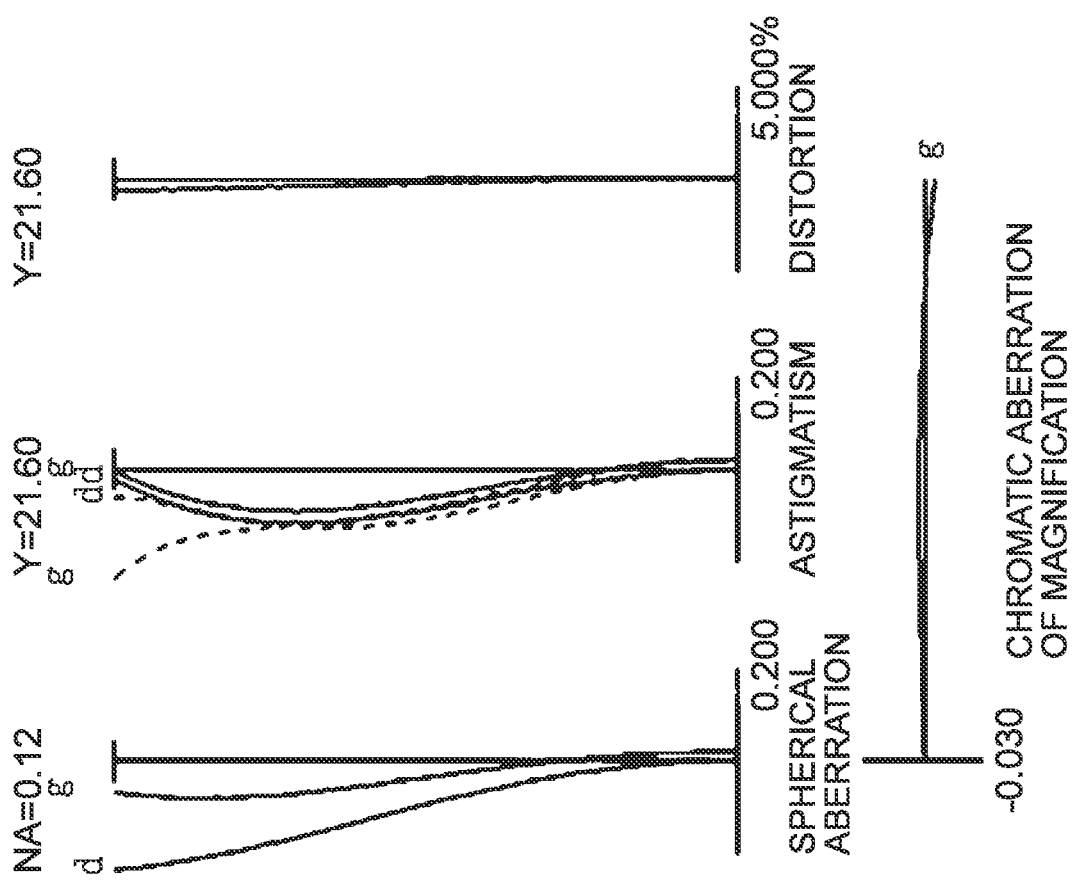

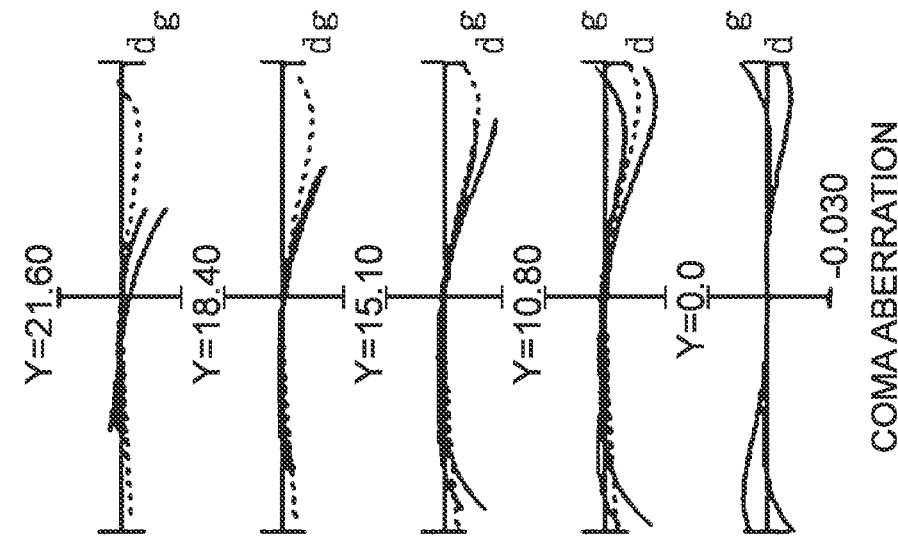
FIG. 3B
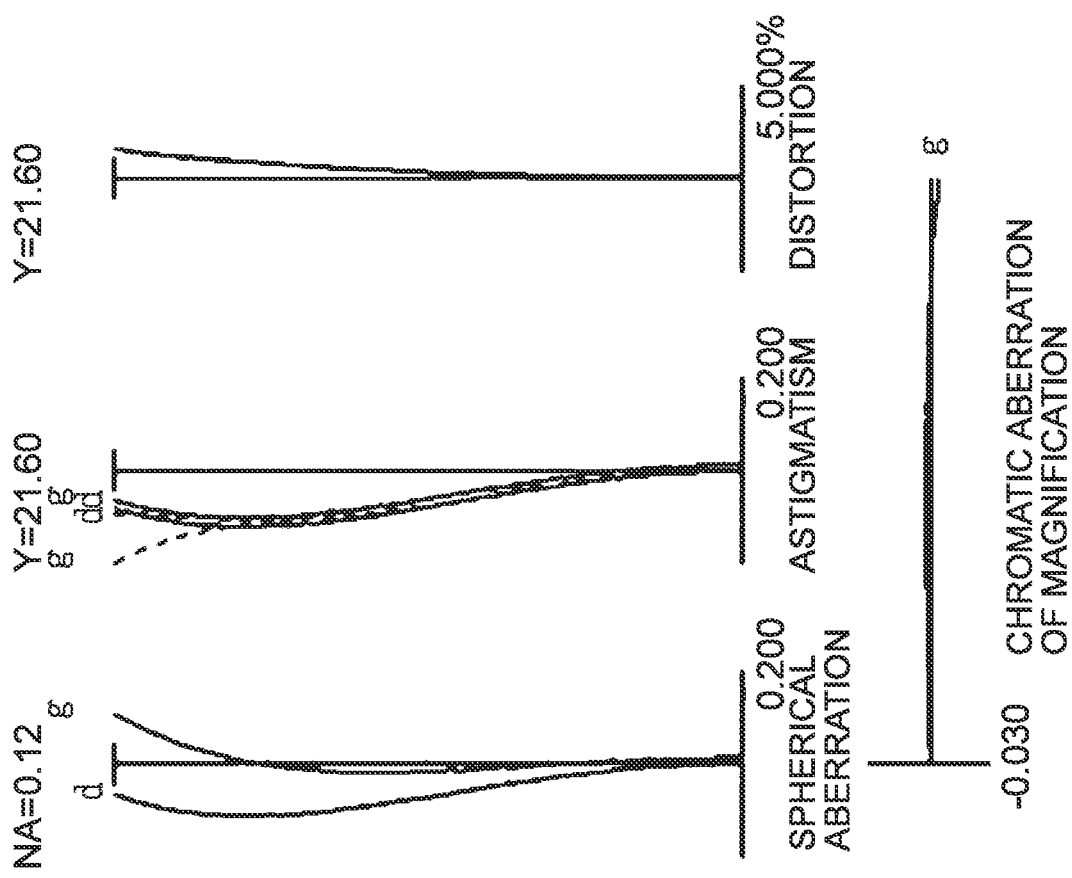

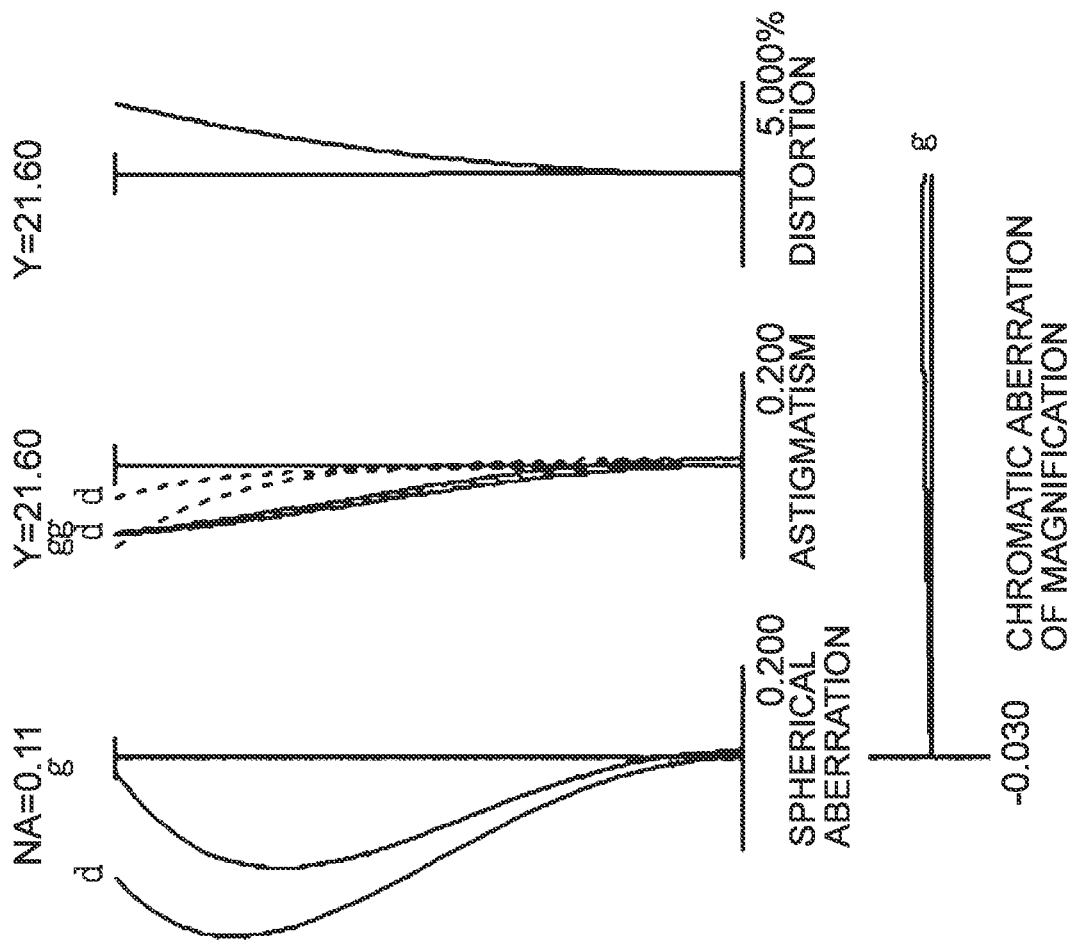

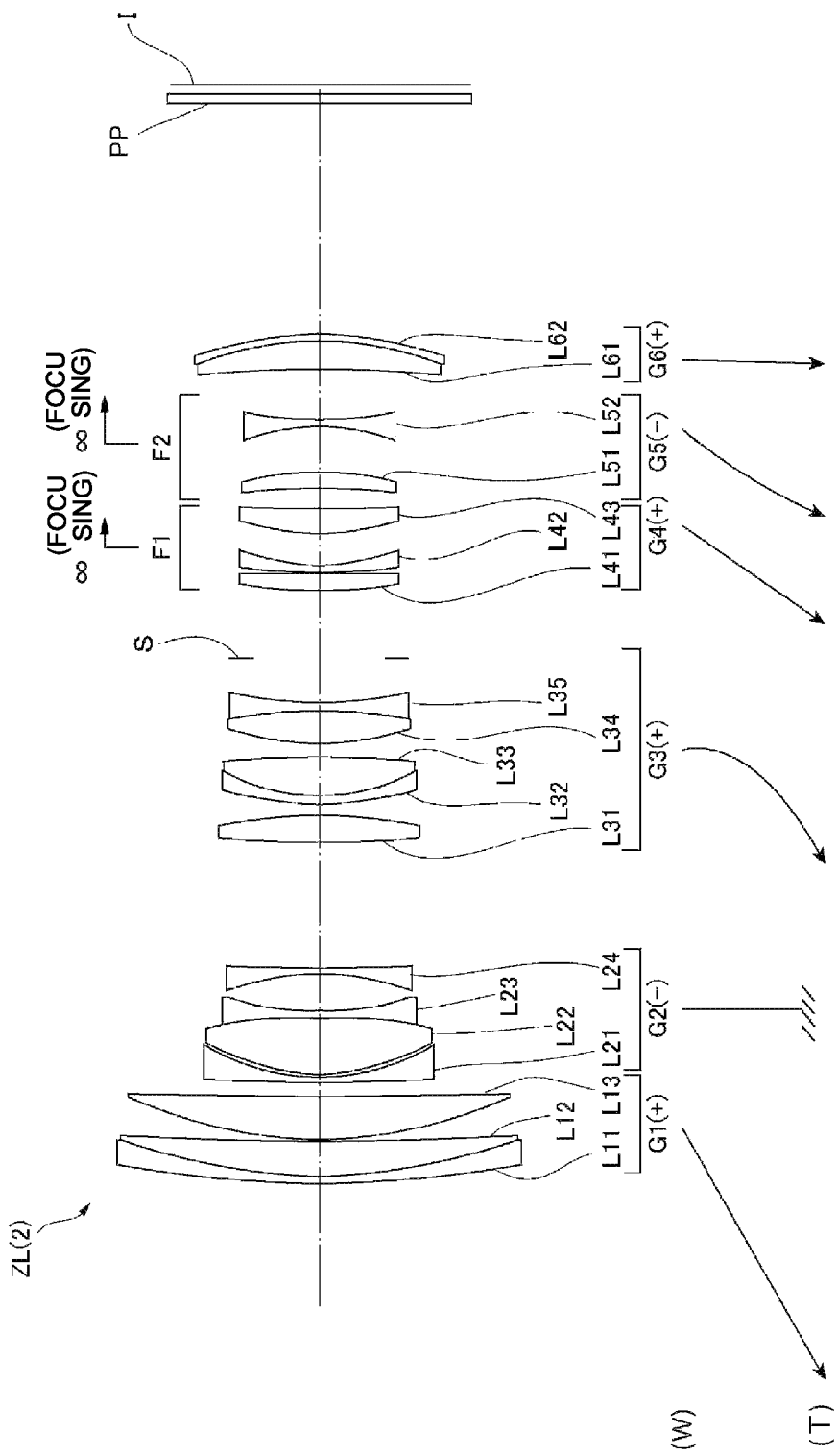

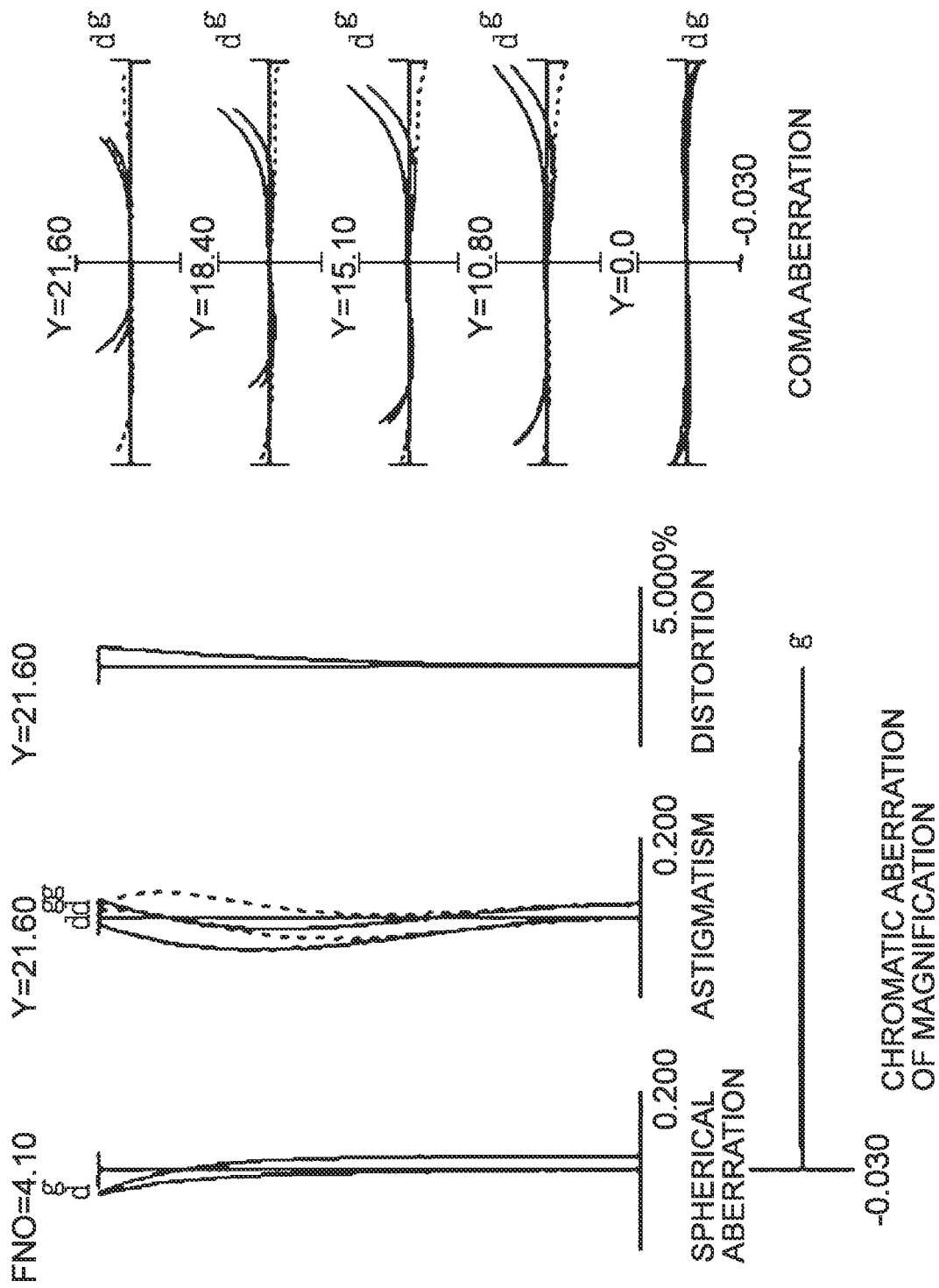

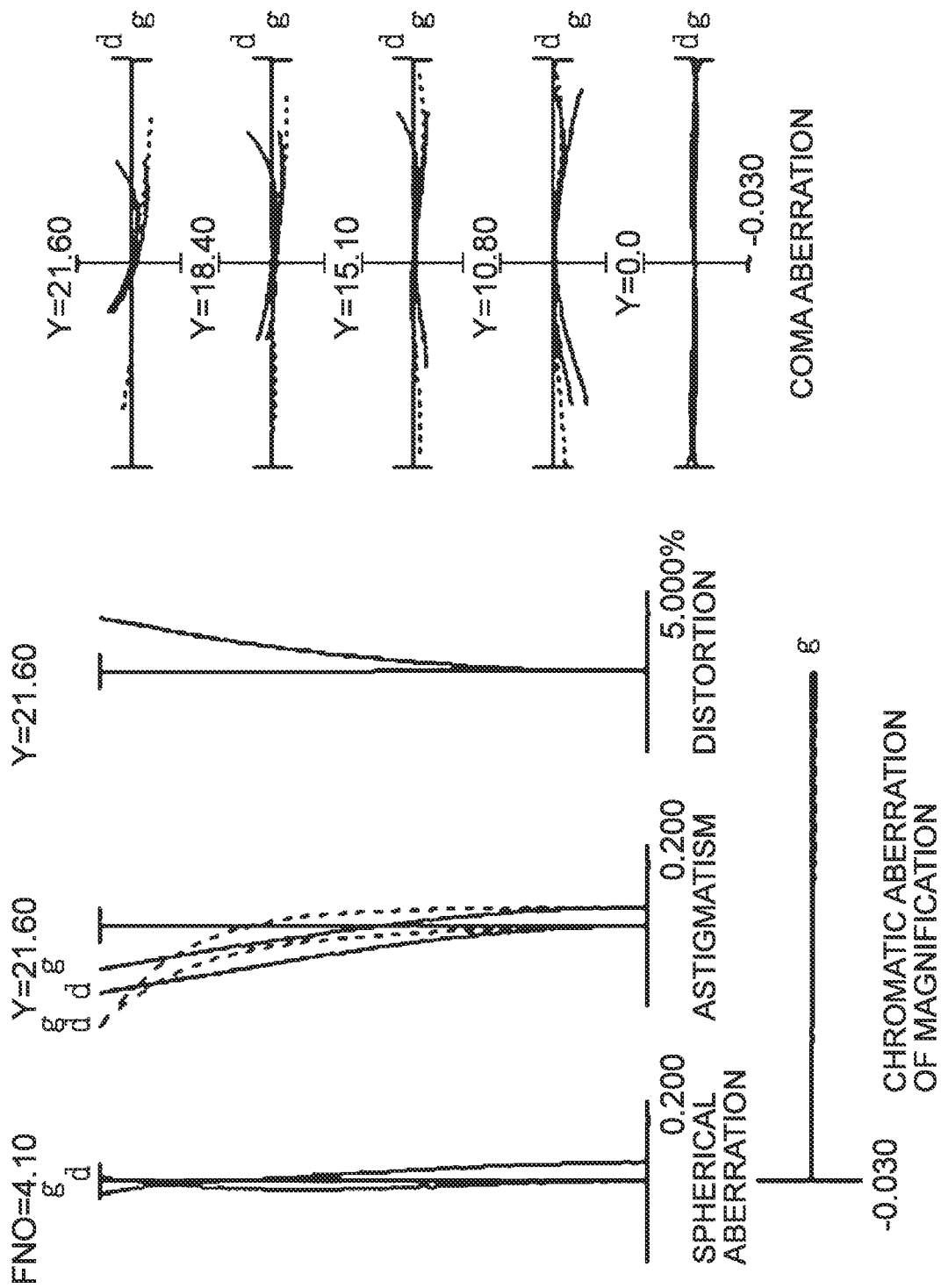

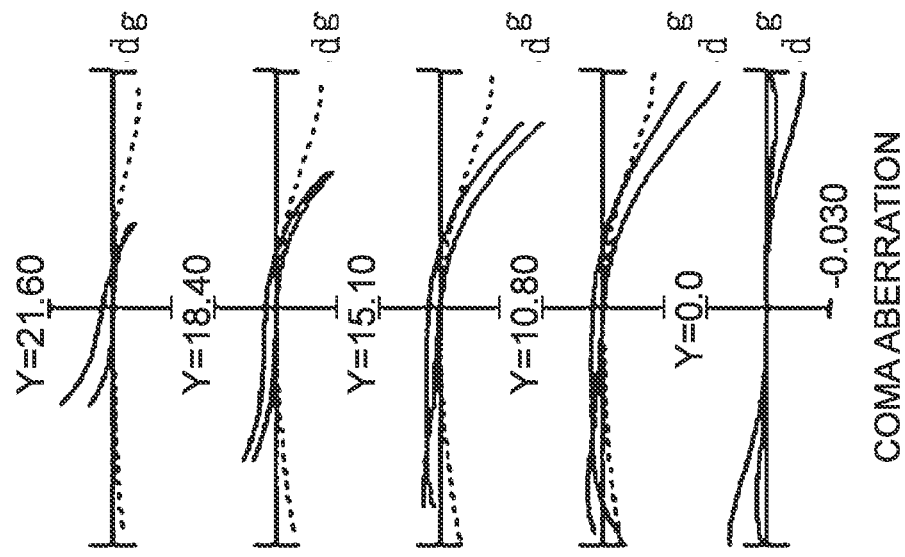
FIG. 6A
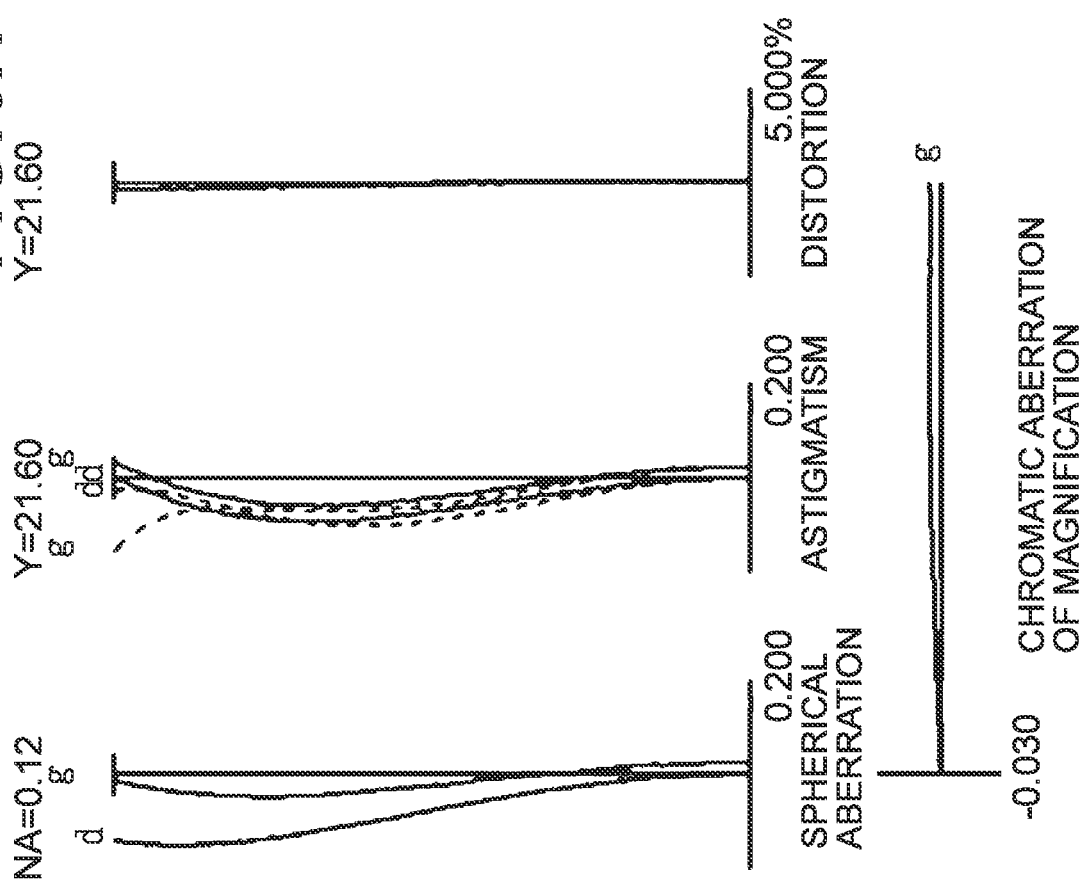

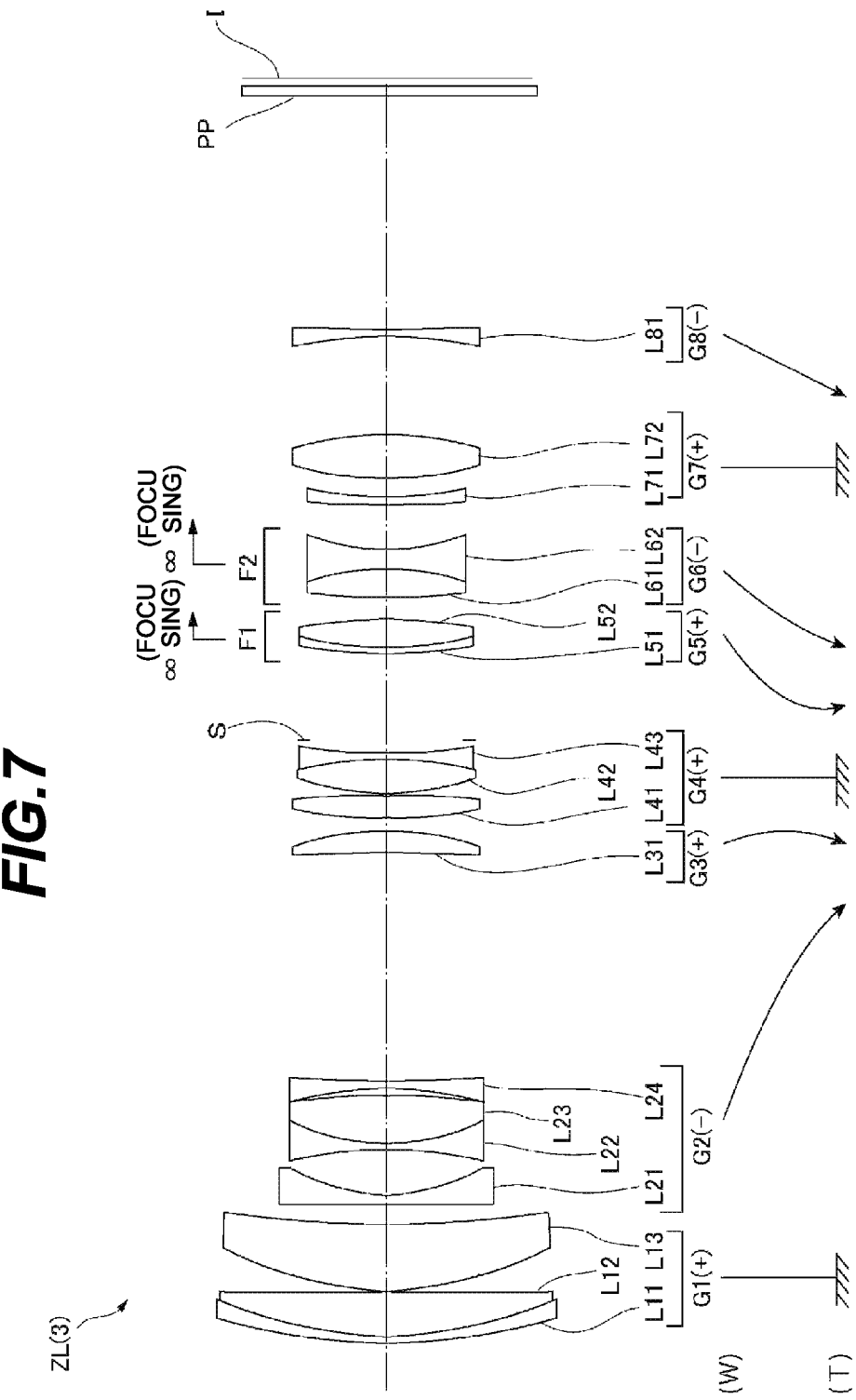

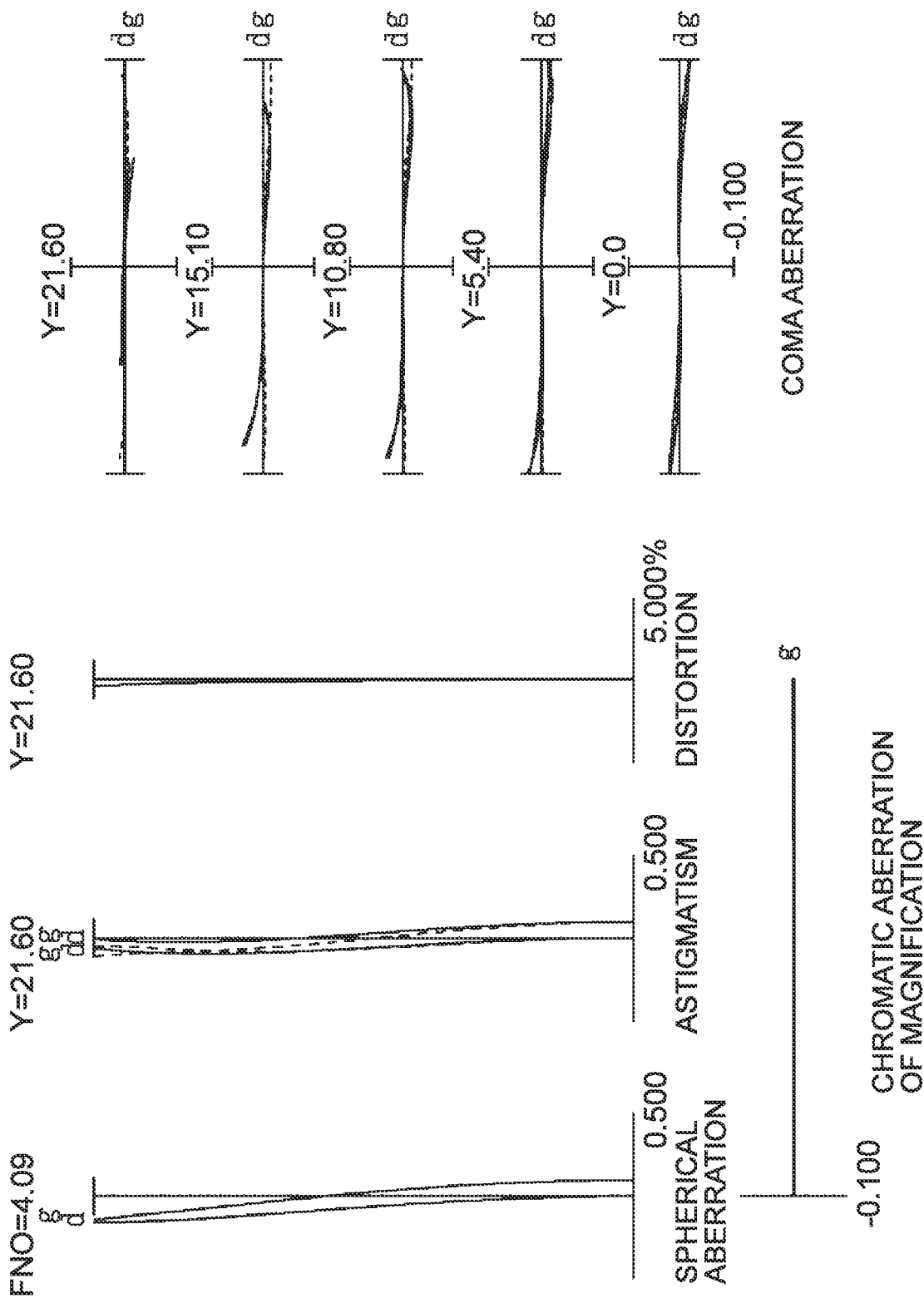

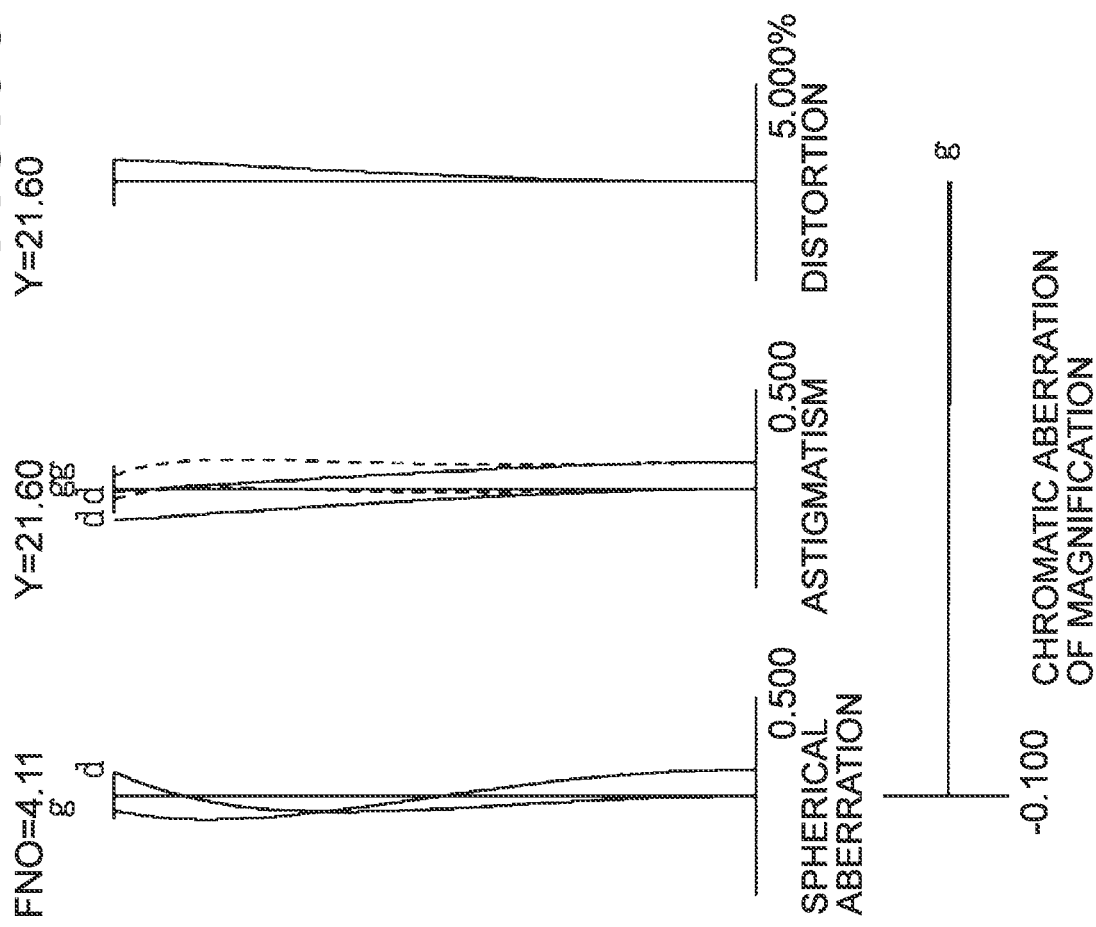

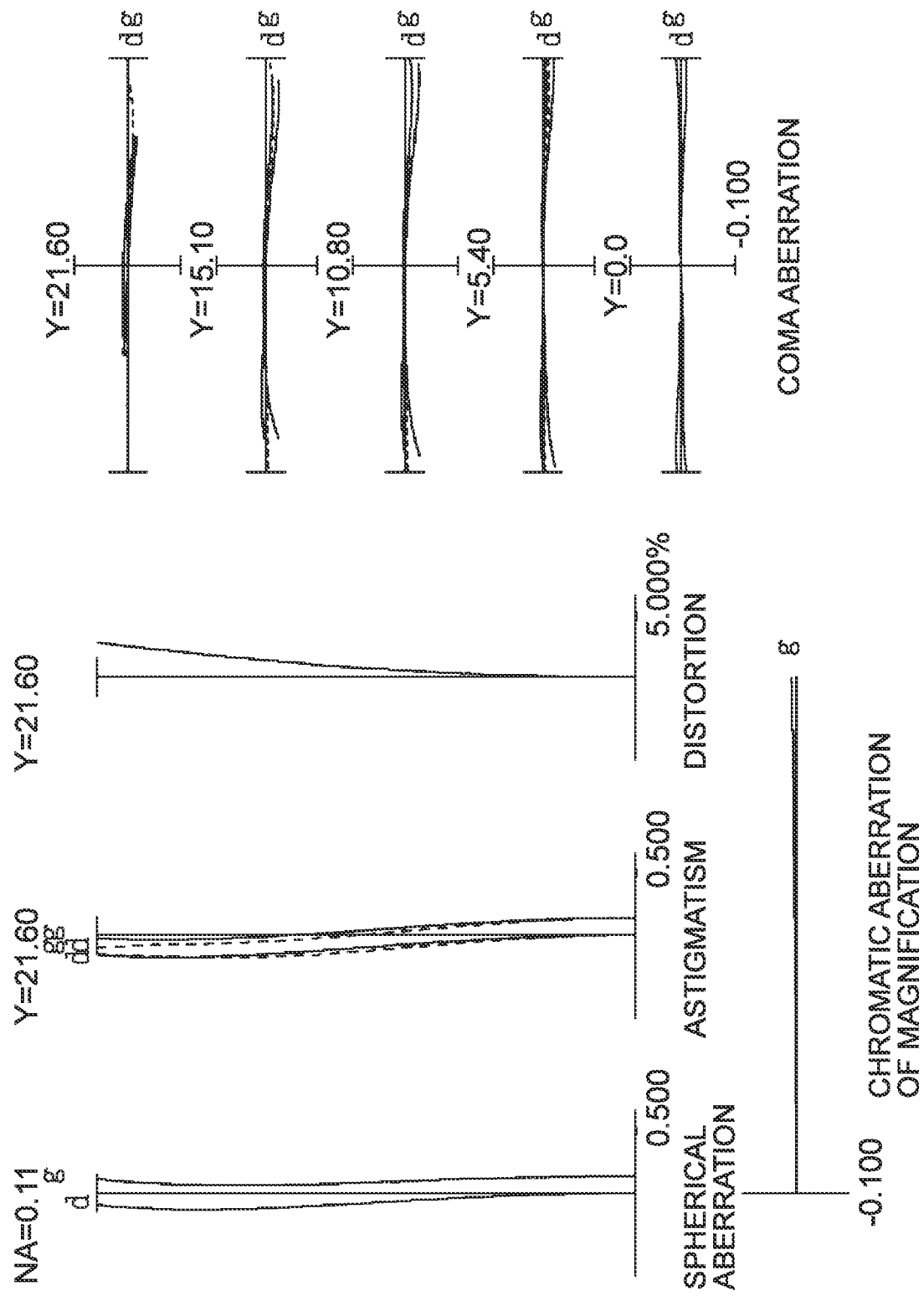

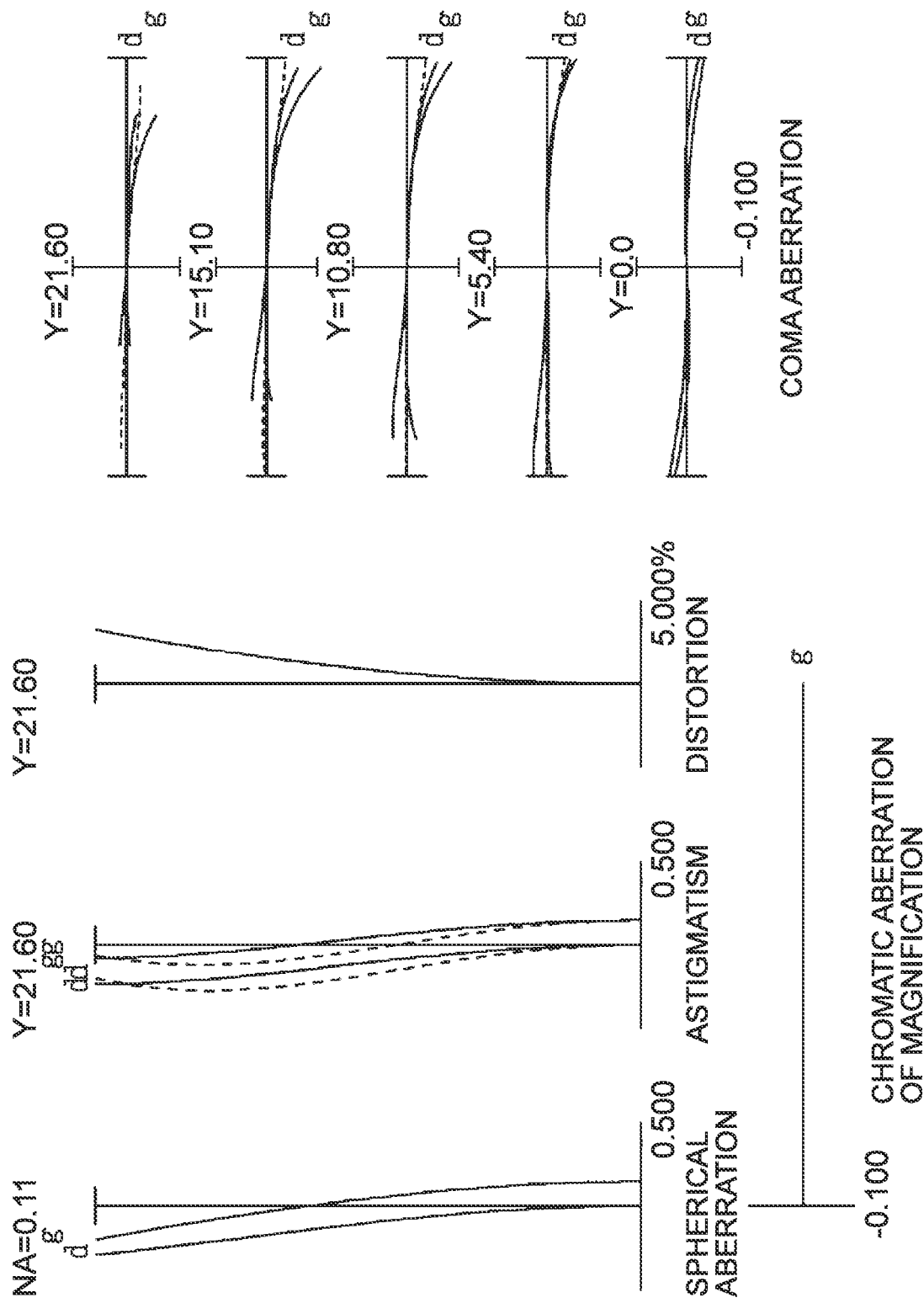

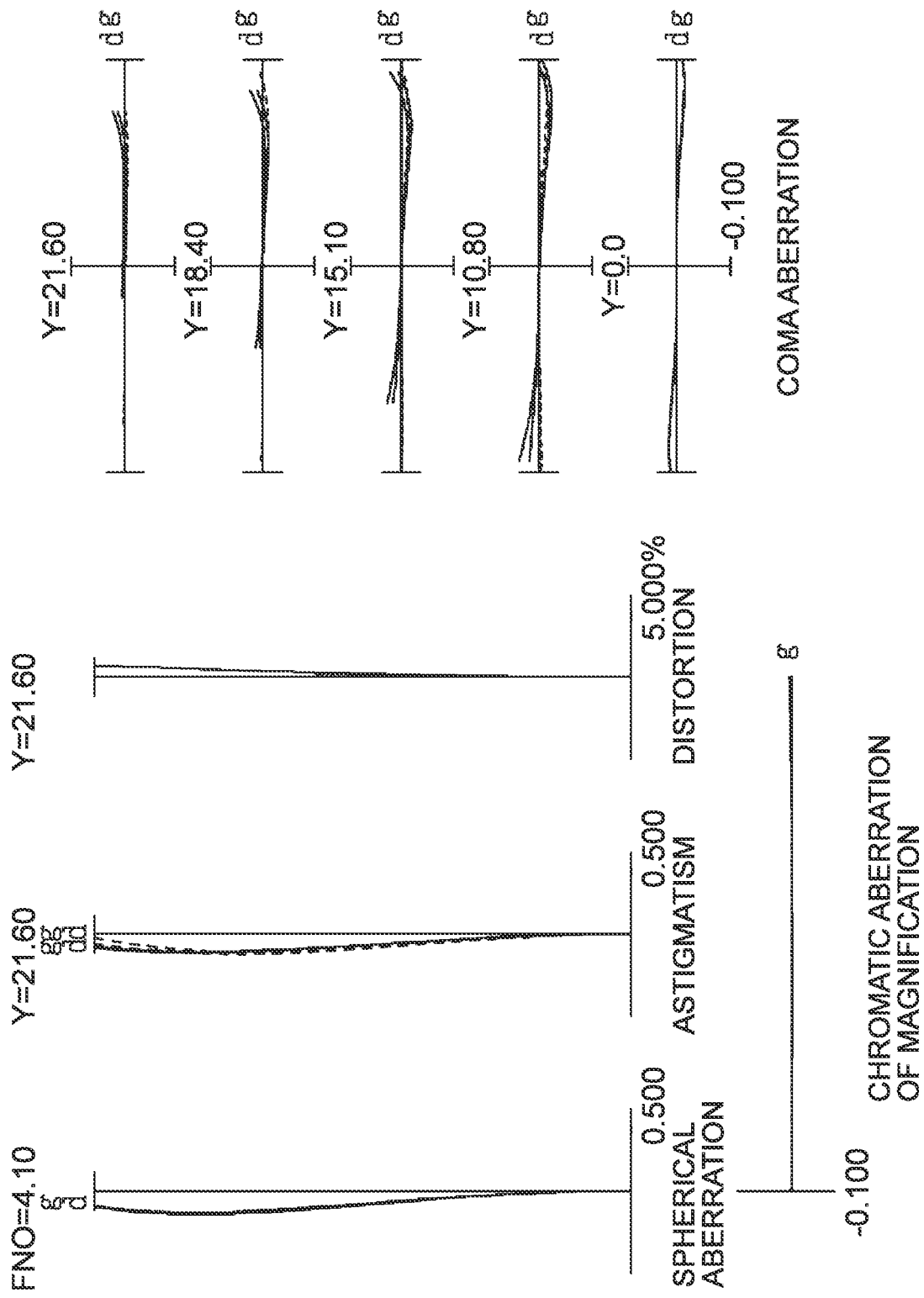

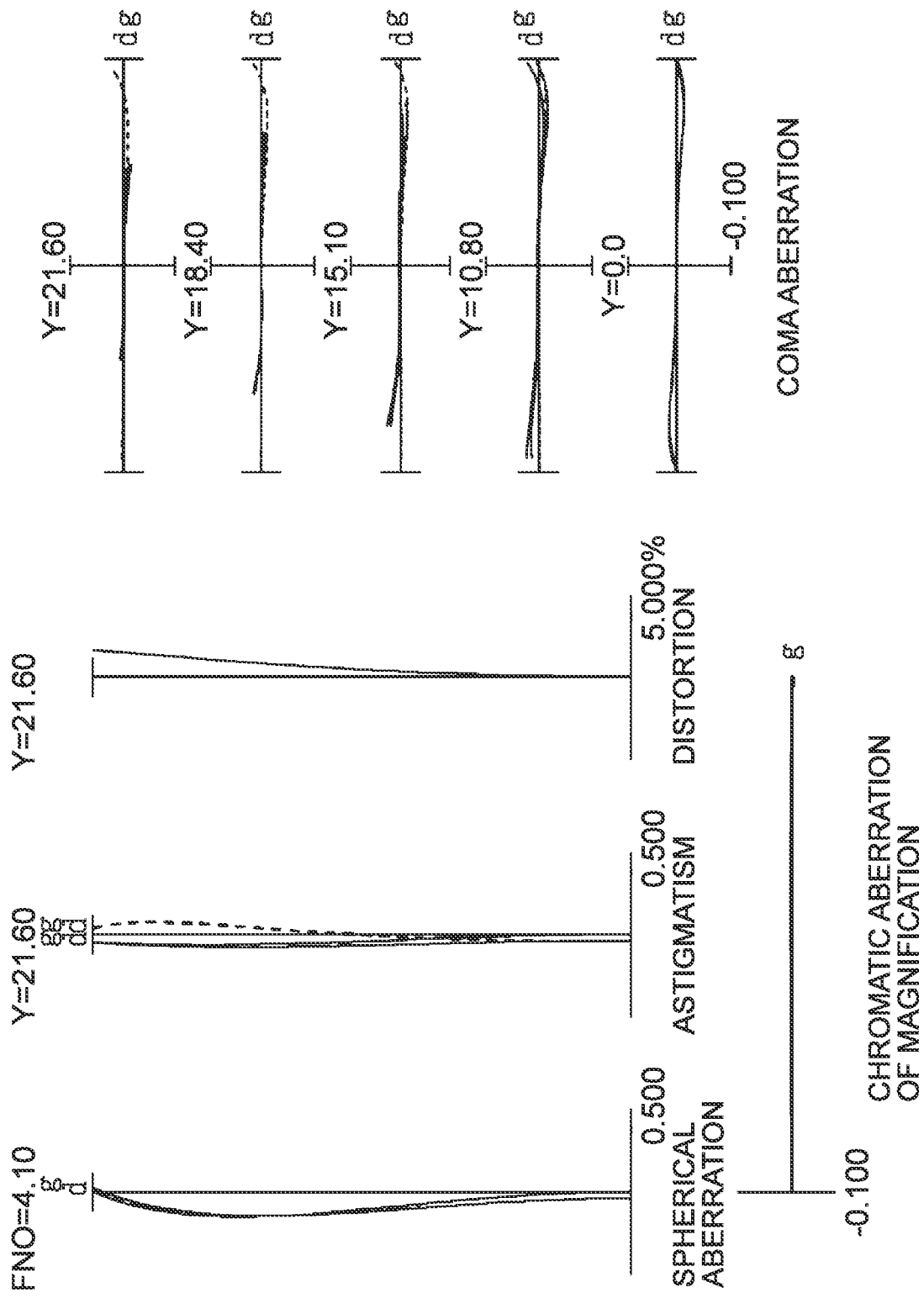

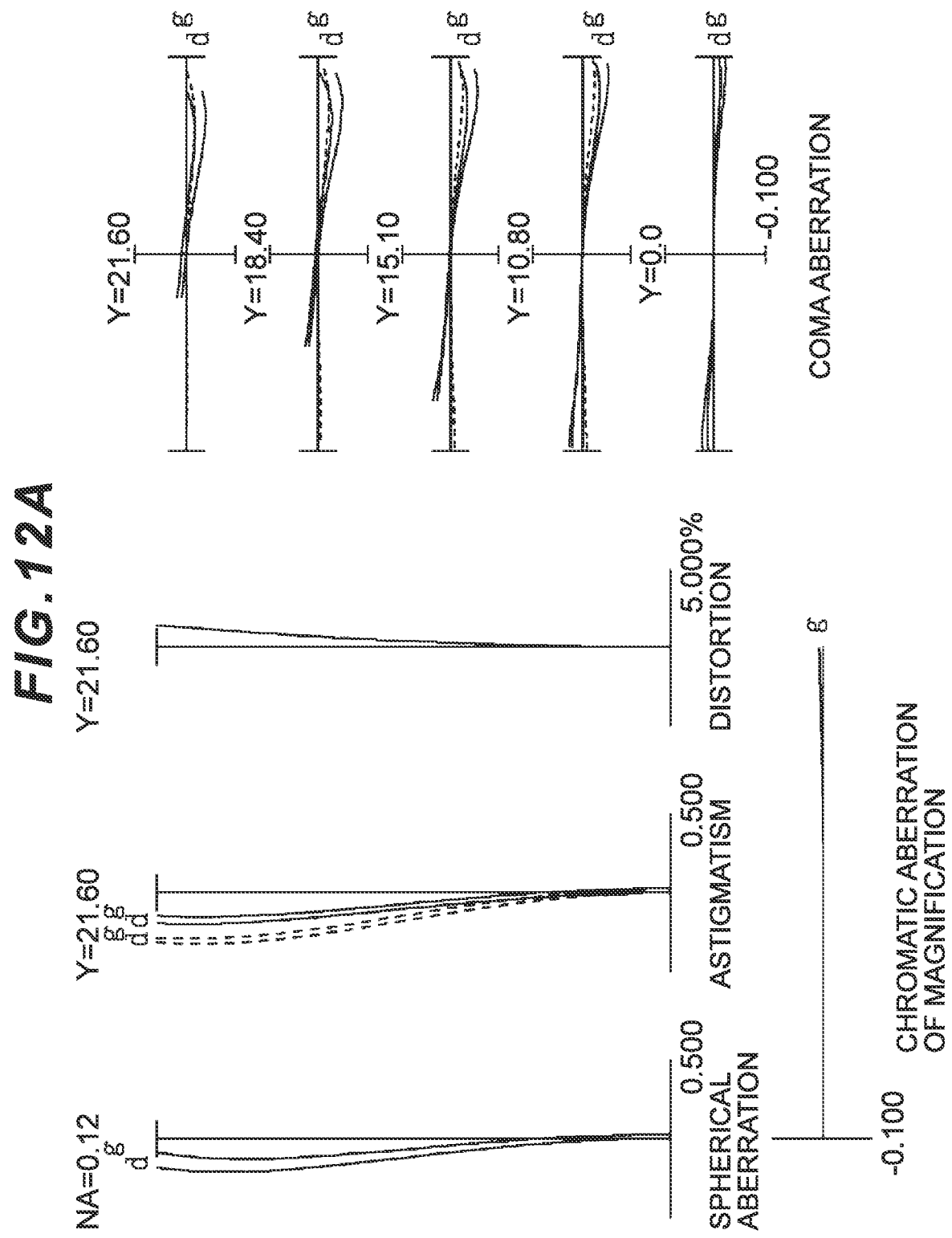

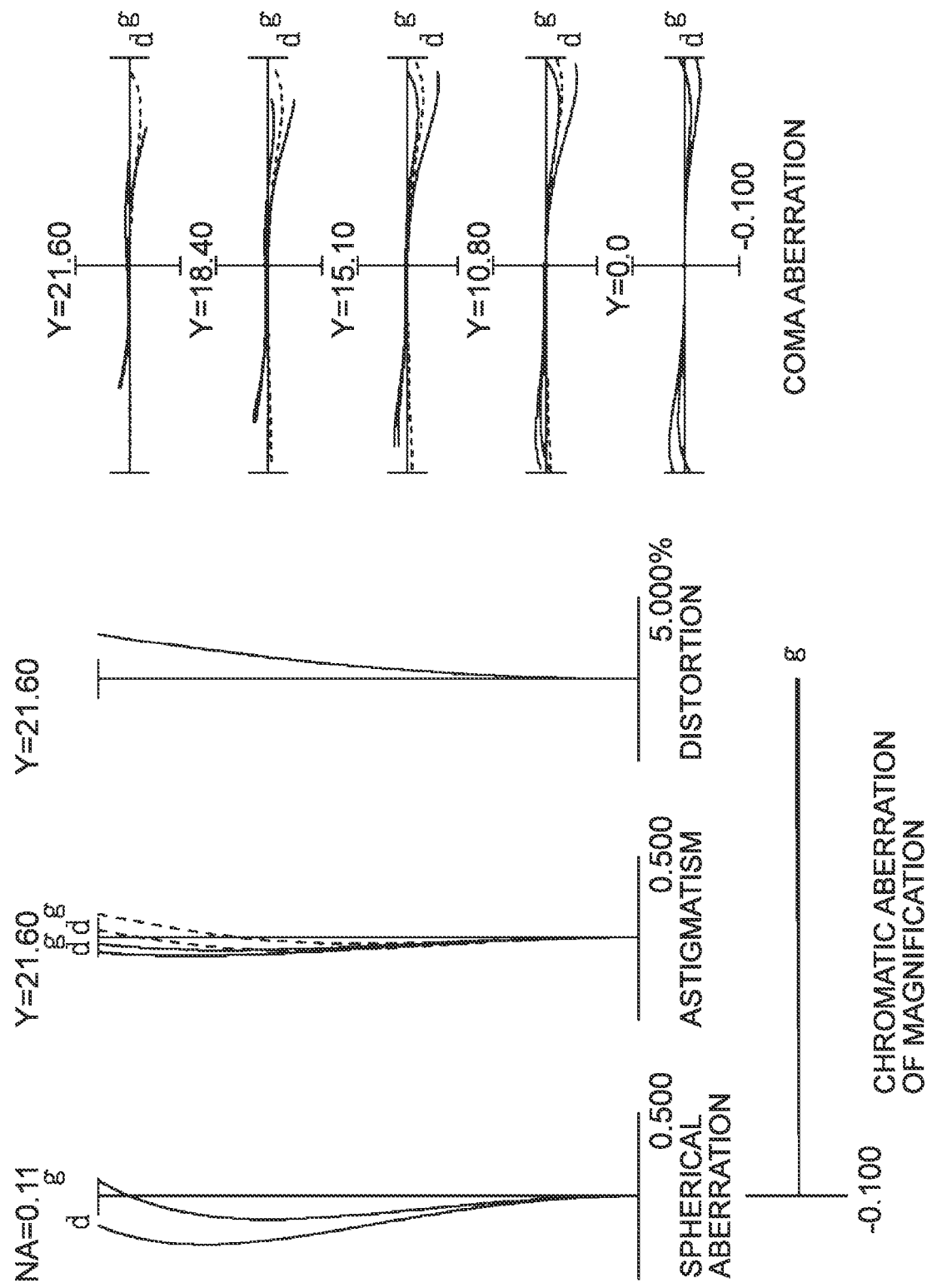

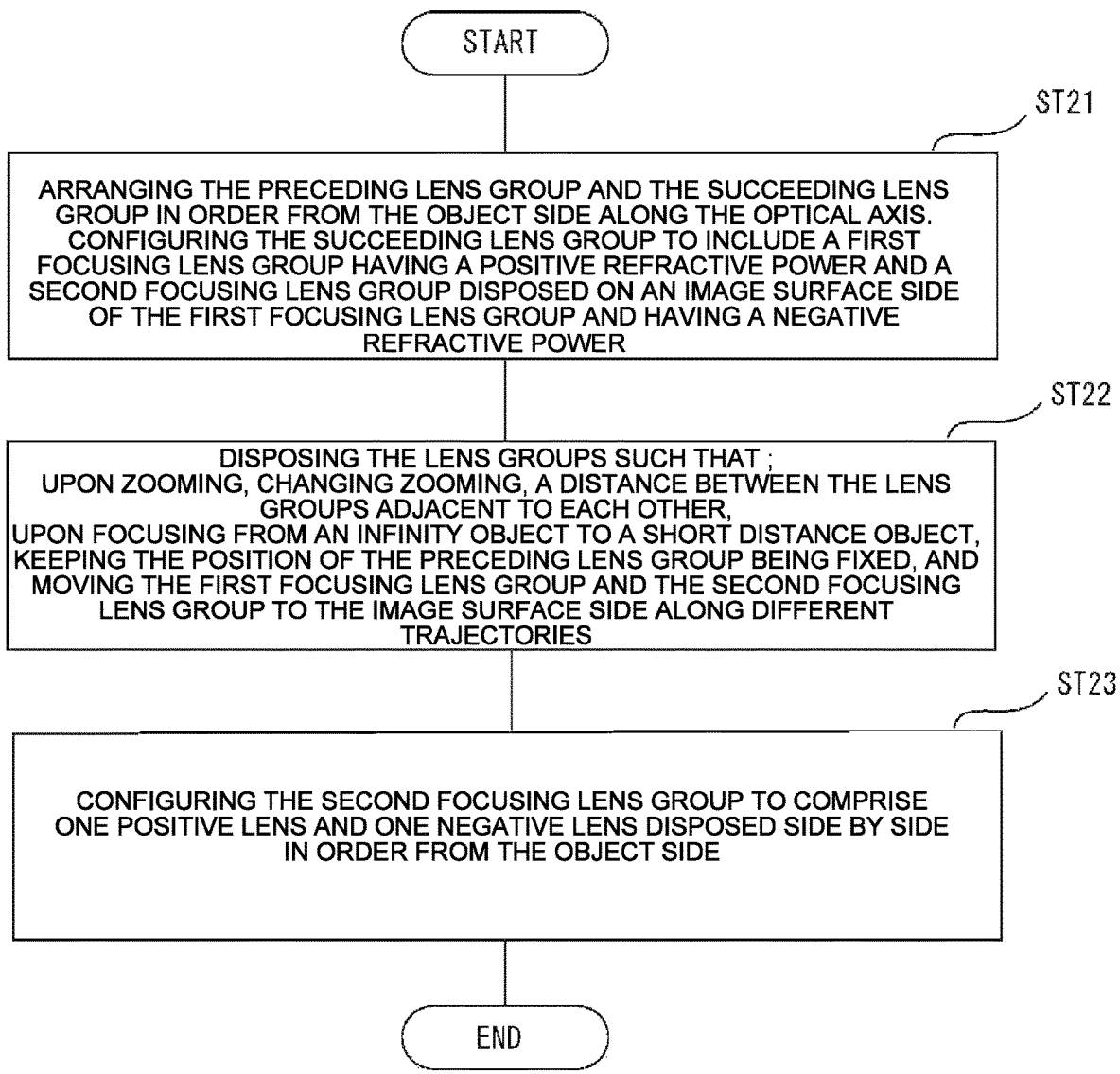

ZOOM OPTICAL SYSTEM, OPTICAL APPARATUS AND METHOD FOR MANUFACTURING THE ZOOM OPTICAL SYSTEM

TECHNICAL FIELD

The present invention relates to a zoom optical system, an optical apparatus, and a method for manufacturing the zoom optical system.

TECHNICAL BACKGROUND

As a zoom lens suitable for photographic cameras, electronic still cameras, video cameras, and the like, there has been proposed a zoom lens that is configured to move a part of a lens group (rear group) disposed near an image surface to focus (see, for example, Patent literature 1). Such a zoom lens is required to suppress various aberrations such as a curvature of field to realize favorable optical performance in focusing.

PRIOR ART LIST

Patent Document

Patent literature 1: Japanese Laid-Open Patent Publication No. 2015-152665(A)

SUMMARY OF THE INVENTION

A first zoom optical system according to the present invention consists of a preceding lens group and a succeeding lens group that are disposed in order from an object side along an optical axis, wherein the succeeding lens group comprises a first focusing lens group having a positive refractive power and a second focusing lens group disposed on an image surface side of the first focusing lens group and having a negative refractive power. Upon zooming, the distance between the lens groups adjacent to each other changes, and upon focusing from an infinity object to a short distance object, the position of the preceding lens group is fixed, and the first focusing lens group and the second focusing lens group move to the image surface side along different trajectories, satisfying the following conditional expression:

$$0.05 < (-fF2)/ft < 0.50,$$

where
fF2: Focal length of the second focusing lens group, and
ft: Focal length of the zoom optical system in a telephoto end state.

A second zoom optical system according to the present invention consists of a preceding lens group and a succeeding lens group that are disposed in order from an object side along an optical axis, wherein the preceding lens group comprises, in order from the object side along the optical axis, a first lens group having a positive refractive power and a second lens group having a negative refractive power, and the succeeding lens group comprises a first focusing lens group having a positive refractive power and a second focusing lens group disposed on an image surface side of the first focusing lens group and having a negative refractive power. Upon zooming from a wide-angle end state to a telephoto end state, the distance between the lens groups adjacent to each other changes, and the first focusing lens group and the second focusing lens group move to the object side along different trajectories, and upon focusing from an infinity object to a short distance object, the first focusing lens group and the second focusing lens group move to the image surface side along different trajectories.

A third zoom optical system according to the present invention consists of a preceding lens group and a succeeding lens group that are disposed in order from an object side along an optical axis, wherein the succeeding lens group comprises a first focusing lens group having a positive refractive power and a second focusing lens group disposed on an image surface side of the first focusing lens group and having a negative refractive power. Upon zooming, the distance between the lens groups adjacent to each other changes, and upon focusing from an infinity object to a short distance object, the position of the preceding lens group is fixed, and the first focusing lens group and the second focusing lens group move to the image surface side along different trajectories. The second focusing lens group comprises one positive lens and one negative lens disposed side by side in order from the object side.

An optical apparatus according to the present invention is configured to be equipped with the zoom optical system described above.

A first method for manufacturing the zoom optical system according to the present invention comprises each lens group and disposes each lens group in a lens barrel as follows. The zoom optical system consists of a preceding lens group and a succeeding lens group disposed in order from an object side along an optical axis, wherein the succeeding lens group comprises a first focusing lens group having a positive refractive power and a second focusing lens group disposed on an image surface side of the first focusing lens group and having a negative refractive power. Upon zooming, the distance between the lens groups adjacent to each other changes, and upon focusing from an infinity object to a short distance object, the position of the preceding lens group is fixed, and the first focusing lens group and the second focusing lens group move to the image surface side along different trajectories, satisfying the following conditional expression:

$$0.05 < (-fF2)/ft < 0.50,$$

where
fF2: Focal length of the second focusing lens group, and
ft: Focal length of the zoom optical system in a telephoto end state.

A second method for manufacturing the zoom optical system according to the present invention comprises each lens group and disposes each lens group in a lens barrel as follows. The preceding lens group and the succeeding lens group are disposed in order from an object side along an optical axis. The preceding lens group comprises, in order from the object side along the optical axis, a first lens group having a positive refractive power and a second lens group having a negative refractive power. The succeeding lens group comprises a first focusing lens group having a positive refractive power and a second focusing lens group disposed on the image surface side of the first focusing lens group and having a negative refractive power. The lens groups are configured in such a manner that, upon zooming from a wide-angle end state to a telephoto end state, the distance between the lens groups adjacent to each other changes, and the first focusing lens group and the second focusing lens group move to the object side along different trajectories, and upon focusing from an infinity object to a short distance object, the first focusing lens group and the second focusing lens group move to the image surface side along different trajectories.

A third method for manufacturing the zoom optical system according to the present invention comprises each lens group and disposes each lens group in a lens barrel as follows. The preceding lens group and the succeeding lens group are disposed in order from an object side along an optical axis. The succeeding lens group comprises a first focusing lens group having a positive refractive power and a second focusing lens group disposed on an image surface side of the first focusing lens group and having a negative refractive power. The lens groups are configured in such a manner that, upon zooming, the distance between the lens groups adjacent to each other changes, and upon focusing from an infinity object to a short distance object, the position of the preceding lens group is fixed, and the first focusing lens group and the second focusing lens group move to the image surface side along different trajectories. The second focusing lens group comprises one positive lens and one negative lens disposed side by side in order from the object side.

BRIEF DESCRIPTION OF THE DRAWINGS

FIGS. 2A-2C show diagrams of various aberrations of the zoom optical system according to Example 1 upon focusing on an infinity object, where FIG. 2A shows various aberration values in a wide-angle end state, FIG. 2B shows various aberration values in an intermediate focal length state, and FIG. 2C shows various aberration values in a telephoto end state.

FIGS. 3A-3C show diagrams of various aberrations of the zoom optical system according to Example 1 upon focusing on a close-range object, where FIG. 3A shows various aberration values in a wide-angle end state, FIG. 3B shows various aberration values in an intermediate focal length state, and FIG. 3C shows various aberration values in a telephoto end state.

FIG. 4 shows a diagram illustrating a lens configuration of a zoom optical system according to Example 2.

FIGS. 5A-5C show diagrams of various aberrations of the zoom optical system according to Example 2 upon focusing on an infinity object, where FIG. 5A shows various aberration values in a wide-angle end state, FIG. 5B shows various aberration values in an intermediate focal length state, and FIG. 5C shows various aberration values in a telephoto end state.

FIGS. 6A-6C show diagrams of various aberrations of the zoom optical system according to Example 2 upon focusing on a close-range object, where FIG. 6A shows various aberration values in a wide-angle end state, FIG. 6B shows various aberration values in an intermediate focal length state, and FIG. 6C shows various aberration values in a telephoto end state.

FIG. 7 shows a diagram illustrating a lens configuration of a zoom optical system according to Example 3.

FIGS. 8A-8C show diagrams of various aberrations of the zoom optical system according to Example 3 upon focusing on an infinity object, where FIG. 8A shows various aberration values in a wide-angle end state, FIG. 8B shows various aberration values in an intermediate focal length state, and FIG. 8C shows various aberration values in a telephoto end state.

FIGS. 9A-9C show diagrams of various aberrations of the zoom optical system according to Example 3 upon focusing on a close-range object, where FIG. 9A shows various aberration values in a wide-angle end state, FIG. 9B shows various aberration values in an intermediate focal length state, and FIG. 9C shows various aberration values in a telephoto end state.

FIGS. 11A-11C show diagrams of various aberrations of the zoom optical system according to Example 4 upon focusing on an infinity object, where FIG. 11A shows various aberration values in a wide-angle end state, FIG. 11B shows various aberration values in an intermediate focal length state, and FIG. 11C shows various aberration values in a telephoto end state.

FIGS. 12A-12C show diagrams of various aberrations of the zoom optical system according to Example 4 upon focusing on a close-range object, where FIG. 12A shows various aberration values in a wide-angle end state, FIG. 12B shows various aberration values in an intermediate focal length state, and FIG. 12C shows various aberration values in a telephoto end state.

FIG. 16 shows a flowchart illustrating a method for manufacturing a zoom optical system according to a third embodiment.

DESCRIPTION OF THE EMBODIMENTS

Figure 13:
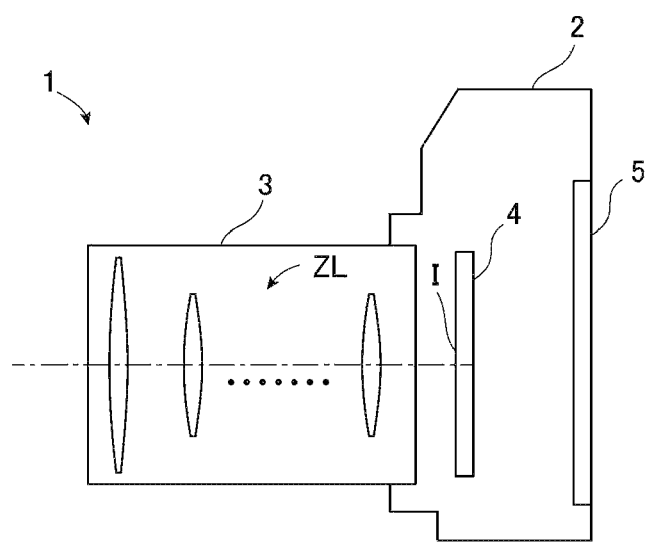
FIG. 13 shows a diagram illustrating a configuration of a digital camera as an embodiment of an optical apparatus.

Preferred embodiments according to the present invention will be described hereinafter. FIG. 13 illustrates a schematic configuration of a digital camera as an embodiment of an optical apparatus. A digital camera 1 includes a main body 2 and a photographing lens 3 that can be attached to and detached from the main body 2. The main body 2 comprises an imaging device 4, a main body control part (not shown) that controls an operation of the digital camera, and a liquid crystal screen 5. The photographing lens 3 includes a zoom optical system ZL consisting of a plurality of lens groups and a lens position control mechanism (not shown) that controls the position of each lens group. The lens position control mechanism includes a sensor that detects the position of a lens group, a motor that moves the lens group back and forth along an optical axis, a control circuit that drives the motor, and the like.

Light from a subject is focused by the zoom optical system ZL of the photographing lens 3 and reaches an image surface I of the imaging device 4. The light from the subject that has reached the image surface I is photoelectrically converted by the imaging device 4 and recorded as digital image data in a memory, not shown. The digital image data recorded in the memory is displayed on the liquid crystal screen 5 in response to an operation by a user. The zoom optical system ZL will be described hereinafter in detail.

A zoom optical system according to a first embodiment consists of a preceding lens group and a succeeding lens group that are disposed in order from an object side along an optical axis, wherein the succeeding lens group includes a first focusing lens group having a positive refractive power and a second focusing lens group disposed on an image surface side of the first focusing lens group and having a negative refractive power. Upon zooming, the distance between the lens groups adjacent to each other changes, and upon focusing from an infinity object to a short distance object, the position of the preceding lens group is fixed, and the first focusing lens group and the second focusing lens group move to the image surface side along different trajectories, satisfying the following conditional expression (1):

$$0.05 < (-fF2)/ft < 0.50 \quad (1),$$

where fF2: Focal length of the second focusing lens group, and ft: Focal length of the zoom optical system in a telephoto end state.

In the foregoing configuration, focusing is performed mainly by the movement of the second focusing lens group, and an aberration changed by the movement of the second focusing lens group is corrected by the first focusing lens group. The conditional expression (1) defines the ratio between the focal length of the second focusing lens group and the focal length of the zoom optical system in a telephoto end state, and indicates an appropriate range of power of the second focusing lens group. By satisfying this conditional expression, various aberrations such as a curvature of field, a spherical aberration, and a chromatic aberration can be favorably corrected when focusing from an infinite object to a close-range object (a short distance object), and aberration fluctuations can be suppressed effectively.

If the corresponding value of the conditional expression (1) exceeds the upper limit value of 0.50, the refractive power of the second focusing lens group becomes weak, making it difficult to correct various aberrations such as the curvature of field upon focusing on a short distance object, to suppress aberration fluctuations. In order to ensure the effect of the present embodiment, the upper limit value of the conditional expression (1) is preferably a smaller value, such as 0.45, 0.40, 0.38, 0.35, 0.33, 0.30, 0.28, or 0.25.

If the corresponding value of the conditional expression (1) is below the lower limit value of 0.05, the refractive power of the second focusing lens group becomes strong, making it difficult to favorably correct various aberrations such as the spherical aberration. In order to ensure the effect of the present embodiment, the lower limit value of the conditional expression (1) is preferably a larger value, such as 0.08, 0.10, 0.13, 0.15, or 0.18.

By satisfying the foregoing conditional expression with the above configuration, the zoom optical system of the first embodiment can favorably correct various aberrations over the entire range from the wide-angle end state to the telephoto end state, and therefore can achieve high optical performance even upon focusing on a short distance object.

A zoom optical system according to a second embodiment consists of a preceding lens group and a succeeding lens group that are disposed in order from an object side along an optical axis, wherein the preceding lens group includes, in order from the object side along the optical axis, a first lens group having a positive refractive power and a second lens group having a negative refractive power, and the succeeding lens group includes a first focusing lens group having a positive refractive power and a second focusing lens group disposed on an image surface side of the first focusing lens group and having a negative refractive power. Upon zooming from a wide-angle end state to a telephoto end state, the distance between the lens groups adjacent to each other changes, the first focusing lens group and the second focusing lens group move to the object side along different trajectories, and upon focusing from an infinity object to a short distance object, the first focusing lens group and the second focusing lens group move to the image surface side along different trajectories.

With the foregoing configuration, the zoom optical system of the second embodiment can favorably correct various aberrations over the entire range from a wide-angle end state to a telephoto end state, and therefore can achieve high optical performance even upon focusing on a short distance object.

A zoom optical system according to a third embodiment consists of a preceding lens group and a succeeding lens group that are disposed in order from an object side along an optical axis, wherein the succeeding lens group includes a first focusing lens group having a positive refractive power and a second focusing lens group disposed on an image surface side of the first focusing lens group and having a negative refractive power. Upon zooming, the distance between the lens groups adjacent to each other changes, and upon focusing from an infinity object to a short distance object, the position of the preceding lens group is fixed, and the first focusing lens group and the second focusing lens group move to the image surface side along different trajectories. The second focusing lens group includes one positive lens and one negative lens disposed side by side in order from the object side.

In the zoom optical system of the third embodiment, focusing is performed mainly by the movement of the second focusing lens group, and an aberration changed by the movement of the second focusing lens group is corrected by the first focusing lens group. In the zoom optical system with such a configuration, if the second focusing lens group is configured by one lens, it becomes difficult to correct various aberrations favorably, but increasing the number of lenses leads to an increase in the weight of the focusing lens group, making it difficult to realize high-speed focusing. However, the configuration in which the second focusing lens group includes one positive lens and one negative lens brings about an advantage that, even if the lens group is moved significantly, fluctuations of various aberrations such as a chromatic aberration can be suppressed and high-speed focusing can be realized by the reduced size and weight of the focusing lens group, whereby the image surface movement coefficient can be lowered. The configuration described above is particularly suitable for telephoto lenses or high magnification lenses.

In the foregoing configuration, by disposing the lenses constituting the second focusing lens group in the order of the positive lens and the negative lens, various aberrations can be corrected more favorably than a configuration in which the lenses are disposed in the order of the negative lens and the positive lens. In the configuration in which the negative lens and the positive lens are disposed in this order, an off-axis light ray passing through the negative lens is separated from the optical axis, and the height of the light ray passing through the positive lens is increased, making it difficult to correct the aberration. In addition, since the light flux on the axis is also diverged, again the height of the light ray passing through the positive lens increases, making it difficult to correct the spherical aberration.

In the zoom optical systems of the first embodiment and the second embodiment, it is preferred that the second focusing lens group include one positive lens and one negative lens disposed side by side in order from the object side. Therefore, upon focusing to a close-range object, various aberrations can favorably be corrected, and high optical performance can be achieved.

It is preferred that the zoom optical system according to the third embodiment further satisfy the following conditional expression (2). It is preferred that the zoom optical systems of the first embodiment and the second embodiment further satisfy the following conditional expression (2) in a case where the second focusing lens group includes a positive lens and a negative lens:

$$vd<37.00 \tag{2},$$

where vd: Abbe number of the positive lens constituting the second focusing lens group.

The conditional expression (2) defines an appropriate range of the Abbe numbers of the positive lenses constituting the second focusing lens group. By satisfying this conditional expression, the chromatic aberration can favorably be corrected. If the corresponding value of the conditional expression (2) exceeds the upper limit value of 37.00, it becomes difficult to favorably correct the axial chromatic aberration and the chromatic aberration of magnification. In order to ensure the effect of the present embodiment, it is preferred that the upper limit value of the conditional expression (2) be a smaller value, such as 33.00 or 29.00.

It is preferred that the zoom optical system of the third embodiment further satisfy the following conditional expression (3). It is preferred that the zoom optical systems of the first embodiment and the second embodiment further satisfy the following conditional expression (3) in a case where the second focusing lens group includes a positive lens and a negative lens:

$$0.80<NdF2n/NdF2p<1.25 \tag{3},$$

where

NdF2n: Refractive index of the negative lens constituting the second focusing lens group with respect to a d-line, and NdF2p: Refractive index of the positive lens constituting the second focusing lens group with respect to the d-line.

The conditional expression (3) defines the ratio between the refractive indexes of the negative lens and the positive lens constituting the second focusing lens group, and indicates a preferable combination of the two lenses. By satisfying this conditional expression, various aberrations can favorably be corrected and aberration fluctuations can be suppressed effectively.

If the corresponding value of the conditional expression (3) exceeds the upper limit value of 1.25, the refractive power of the negative lens becomes relatively weak, making it difficult to favorably correct various aberrations such as the curvature of field upon focusing on a short distance object. In order to ensure the effect of the present embodiment, it is preferred that the upper limit value of the conditional expression (3) be a smaller value, such as 1.23, 1.20, 1.18, 1.15, or 1.11.

If the corresponding value of the conditional expression (3) is below the lower limit value of 0.80, the refractive power of the negative lens becomes relatively strong, making it difficult to correct the Petzval sum. In order to ensure the effect of the present embodiment, it is preferred that the lower limit value of the conditional expression (3) be a larger value, such as 0.83, 0.85, 0.88, 0.90, 0.92, or 0.95.

It is preferred that the zoom optical systems of the first to third embodiments further satisfy the following conditional expression (4):

$$0.05<MF1t/MF2t<0.40 \tag{4},$$

where

MF1t: Movement amount of the first focusing lens group in a telephoto end state upon focusing from an infinity object to a close-range object, and MF2t: Movement amount of the second focusing lens group in a telephoto end state upon focusing from an infinity object to a close-range object (Movement amount is the amount of movement to the image surface side, expressed by a positive value.)

The conditional expression (4) defines the ratio between the movement amounts of the two focusing lens groups upon focusing from an infinity object to a close-range object. The aberrations fluctuate significantly if the focusing lens groups are shifted significantly. However, by satisfying this conditional expression, various aberrations can favorably be corrected and aberration fluctuations upon focusing can be suppressed effectively.

If the corresponding value of the conditional expression (4) exceeds the upper limit value of 0.40, the movement of the second focusing lens group becomes relatively small, making it difficult to favorably correct various aberrations such as the curvature of field upon focusing on a short distance object. In order to ensure the effect of the present embodiment, it is preferred that the upper limit value of the conditional expression (4) be a smaller value, such as 0.38, 0.35, 0.34, 0.30, 0.28, or 0.25.

If the corresponding value of the conditional expression (4) is below the lower limit value of 0.05, the movement of the second focusing lens group becomes relatively large, and the negative curvature of field becomes large, making it difficult to correct the off-axis aberration. In order to ensure the effect of the present embodiment, it is preferred that the lower limit value of the conditional expression (4) be a larger value, such as 0.06, 0.08, 0.10, or 0.11.

It is preferred that the zoom optical systems of the first to third embodiments further satisfy the following conditional expression (5):

$$0.04<\beta F1t/\beta F2t<0.20 \tag{5},$$

where $\beta F1t$: Lateral magnification of the first focusing lens group in a telephoto end state upon focusing on an infinity object, and $\beta F2t$: Lateral magnification of the second focusing lens group in a telephoto end state upon focusing on an infinity object.

The conditional expression (5) defines the ratio between lateral magnifications of the first focusing lens group and the second focusing lens group upon focusing on an infinity object at a telephoto end. By satisfying this conditional expression, various aberrations can favorably be corrected while suppressing the movement amounts of the focusing lens groups in focusing.

If the corresponding value of the conditional expression (5) exceeds the upper limit value of 0.20, the lateral magnification of the first focusing lens group becomes relatively large, making it difficult to suppress the movement amount of the focusing lens group or to favorably correct the spherical aberration. In order to ensure the effect of the present embodiment, it is preferred that the upper limit value of the conditional expression (5) be a smaller value, such as 0.18, 0.16, 0.15, or 0.14.

If the corresponding value of the conditional expression (5) is below the lower limit value of 0.04, the lateral magnification of the first focusing lens group becomes relatively small, making it difficult to correct the curvature of field and astigmatic distance. In order to ensure the effect of the present embodiment, it is preferred that the lower limit value of the conditional expression (5) be a larger value, such as 0.05 or 0.06.

It is preferred that the zoom optical systems of the first to third embodiments comprise a rear lens group disposed adjacent to the second focusing lens group on the image surface side of the second focusing lens group and satisfy the following conditional expression (6):

$$0.05 < \beta F1w/\beta LGw < 2.50 \qquad (6),$$

where

βF1w: Lateral magnification of the first focusing lens group in a wide-angle end state upon focusing on an infinity object, and βLGw: Lateral magnification of the rear lens group in a wide-angle end state upon focusing on an infinity object.

The conditional expression (6) defines the ratio between the lateral magnification of the first focusing lens group in a wide-angle end state upon focusing on an infinity object and the lateral magnification of the rear lens group in a wide-angle end state upon focusing on an infinity object. By satisfying this conditional expression, various aberrations can favorably be corrected without expanding the optical systems.

If the corresponding value of the conditional expression (6) exceeds the upper limit value of 2.50, the lateral magnification of the first focusing lens group becomes relatively large and the movement amount upon focusing becomes large. If the power of the second focusing lens group is increased in order to reduce the impact of the increased lateral magnification and movement amount, it becomes difficult to favorably correct various aberrations such as the spherical aberration. In order to ensure the effect of the present embodiment, it is preferred that the upper limit value of the conditional expression (6) be a smaller value, such as 2.45, 2.40, 2.38, 2.35, 2.30, 2.25, 2.20, 2.00, 1.80, 1.60, or 1.50.

If the corresponding value of the conditional expression (6) is below the lower limit value of 0.05, and if the lateral magnification of the first focusing lens group is small, it becomes difficult to favorably correct the curvature of field and astigmatic distance. If the magnification of the rear lens group on the image surface side of the second focusing lens group is large, the entire length of the optical system becomes long, making it difficult to downsize the optical system.

It is preferred that the zoom optical systems of the first to third embodiments further satisfy the following conditional expression (7):

$$0.40 < (-fF2)/fF1 < 0.80 \qquad (7),$$

where fF1: Focal length of the first focusing lens group, and fF2: Focal length of the second focusing lens group.

The conditional expression (7) defines the ratio between the focal lengths of the first focusing lens group and the second focusing lens group, and indicates an appropriate range of the power balance of the two focusing lens groups. By satisfying this conditional expression, various aberrations can favorably be corrected while suppressing the movement amounts of the focusing lens groups upon focusing.

If the corresponding value of the conditional expression (7) exceeds the upper limit value of 0.80, the refractive power of the second focusing lens group becomes relatively weak, making it difficult to correct various aberrations such as the curvature of field upon focusing on a short distance object. In order to ensure the effect of the present embodiment, it is preferred that the upper limit of the conditional expression (7) be a smaller value, such as 0.78, 0.75, 0.73, 0.70, or 0.68.

If the corresponding value of the conditional expression (7) is below the lower limit value of 0.40, the refractive power of the second focusing lens group becomes relatively strong and the negative curvature of field becomes large upon focusing on a short distance object, making it difficult to correct the off-axis aberration. In order to ensure the effect of the present embodiment, it is preferred that the lower limit value of the conditional expression (7) be a larger value, such as 0.43, 0.45, 0.48, 0.50, 0.53, 0.55, or 0.58.

In addition, it is preferred that the zoom optical systems of the first to third embodiments have a configuration in which a lens component with a negative refractive power is disposed at the position closest to the image surface of the succeeding lens group. The term "lens component" used herein means that the lens may be either a single lens or a cemented lens. By disposing the negative lens component at the rearmost part of the optical system, the entire length of the optical system and the diameter of the lens component at the rearmost part can be reduced, and downsizing of the optical system can easily be realized. This configuration is suitable for mirrorless type cameras.

Furthermore, it is preferred that the zoom optical systems of the first to third embodiments comprise an aperture stop disposed on the optical axis, and that the first focusing lens group and the second focusing lens group be disposed closer to the image surface than the aperture stop. As a result, fluctuations of the magnification upon focusing can be reduced, and the spherical aberration and the curvature of field can be corrected in a well-balanced manner.

In the zoom optical systems of the first to third embodiments, it is preferred that the first focusing lens group and the second focusing lens group be disposed adjacent to each other. As a result, fluctuations of the spherical aberration and the curvature of field upon focusing can favorably be suppressed.

In addition, it is preferred that the zoom optical systems of the first to third embodiments further satisfy the following conditional expression (8):

$$0.00 < \beta F1 < 0.90 \qquad (8),$$

where

βF1: Lateral magnification of the first focusing lens group upon focusing on an infinity object.

The conditional expression (8) defines the lateral magnification of the first focusing lens group in focusing on an infinity object. By satisfying this conditional expression (8), when focusing from an infinity object to a short distance object, fluctuations of various aberrations including the spherical aberration can be suppressed, achieving high optical performance over the entire range.

If the corresponding value of the conditional expression (8) exceeds the upper limit value of 0.90, it becomes difficult to suppress fluctuations of various aberrations in focusing. In order to ensure the effect of the present embodiment, it is preferred that the upper limit value of the conditional expression (8) be a smaller value, such as 0.85, 0.80, 0.75, 0.70, 0.65, 0.60, 0.55, 0.50, 0.45, or 0.43.

However, if the corresponding value of the conditional expression (8) is below the lower limit value of 0.00, it becomes difficult to suppress fluctuations of various aberrations in focusing. In order to ensure the effect of the present embodiment, it is preferred that the lower limit value of the conditional expression (7) be a larger value, such as 0.05, 0.10, 0.15, 0.20, 0.23, 0.25, 0.28, 0.30, 0.33, or 0.35.

Also, it is preferred that the zoom optical systems of the first to third embodiments further satisfy the following conditional expression (9):

$$0.00 < 1/\beta F2 < 0.90 \qquad (9),$$

where

βF2: Lateral magnification of the second focusing lens group upon focusing on an infinity object.

The conditional expression (9) defines the lateral magnification of the second focusing lens group upon focusing on an infinity object. By satisfying this conditional expression (9), upon focusing from an infinity object to a short distance object, fluctuations of various aberrations including the spherical aberration can be suppressed, achieving high optical performance over the entire range.

If the corresponding value of the conditional expression (9) exceeds the upper limit value of 0.90, it becomes difficult to suppress fluctuations of various aberrations during focusing. In order to ensure the effect of the present embodiment, it is preferred that the upper limit value of the conditional expression (9) be a smaller value, such as 0.85, 0.80, 0.75, 0.70, 0.65, 0.60, 0.55, 0.53, 0.50, 0.48, 0.45, 0.43, or 0.40.

On the other hand, if the corresponding value of the conditional expression (9) is below the lower limit value of 0.00, it becomes difficult to suppress fluctuations of various aberrations during focusing. In order to ensure the effect of the present embodiment, it is preferred that the lower limit value of the conditional expression (9) be a larger value, such as 0.03, 0.05, 0.08, 0.10, or 0.12.

Also, it is preferred that the zoom optical systems of the first to third embodiments further satisfy the following conditional expression (10):

$$\{\beta F1 + (1/\beta F1)\}^{-2} < 0.25 \qquad (10),$$

where

βF1: Lateral magnification of the first focusing lens group upon focusing on an infinity object.

The conditional expression (10) defines the conditions satisfied by the lateral magnification of the first focusing lens group upon focusing on an infinity object. By satisfying this conditional expression (10), when focusing from an infinity object to a short distance object, fluctuations of various aberrations including the spherical aberration can be suppressed, achieving high optical performance over the entire range.

If the corresponding value of the conditional expression (10) exceeds the upper limit value of 0.25, it becomes difficult to suppress fluctuations of various aberrations during focusing. In order to ensure the effect of the present embodiment, it is preferred that the upper limit value of the conditional expression (10) be a smaller value, such as 0.23, 0.20, 0.18, 0.16, 0.15, or 0.13.

Also, it is preferred that the zoom optical systems of the first to third embodiments further satisfy the following conditional expression (11):

$$\{\beta F2 + (1/\beta F2)\}^{-2} < 0.25 \qquad (11),$$

where

βF2: Lateral magnification of the second focusing lens group upon focusing on an infinity object.

The conditional expression (11) defines the conditions satisfied by the lateral magnification of the second focusing lens group upon focusing on an infinity object. By satisfying this conditional expression (11), when focusing from an infinity object to a short distance object, fluctuations of various aberrations including the spherical aberration can be suppressed, achieving high optical performance over the entire range.

If the corresponding value of the conditional expression (11) exceeds the upper limit value of 0.25, it becomes difficult to suppress fluctuations of various aberrations upon focusing. In order to ensure the effect of the present embodiment, it is preferred that the upper limit value of the conditional expression (11) be a smaller value, such as 0.23, 0.20, 0.18, 0.16, 0.15, or 0.13.

In the zoom optical systems of the first to third embodiments, the preceding lens group can be configured to include, in order from the object side along the optical axis, for example, a first lens group having a positive refractive power, a second lens group having a negative refractive power, and a third lens group having a positive refractive power.

In a case where the preceding lens group is configured as described above, it is preferred that the zoom optical systems of the first to third embodiments further satisfy the following conditional expression (12):

$$0.05 < (-f2)/TLw < 0.30 \qquad (12),$$

where f2: Focal length of the second lens group, and

TLw: Entire length of the zoom optical system in a wide-angle end state upon focusing on an infinity object.

The conditional expression (12) defines the focal length of the second lens group as a ratio to the entire length of the zoom optical system in a wide-angle end state. By satisfying this conditional expression, various aberrations can favorably be corrected ranging from the wide-angle end state to the telephoto end state.

If the corresponding value of the conditional expression (12) exceeds the upper limit value of 0.30, the refractive power of the second lens group becomes weak, making it difficult to favorably correct the curvature of field and astigmatic distance in the wide-angle end state, and to favorably correct the spherical aberration in the telephoto end state. In order to ensure the effect of each embodiment, it is preferred that the upper limit value of the conditional expression (12) be a smaller value, such as 0.28, 0.26, 0.24, 0.22, or 0.20.

If the corresponding value of the conditional expression (12) is below the lower limit value of 0.05, the refractive power of the second lens group becomes strong, making it difficult to favorably correct the curvature of field and astigmatic distance. In order to ensure the effect of each embodiment, it is preferred that the lower limit value of the conditional expression (12) be a larger value, such as 0.08, 0.10, 0.12, 0.14, or 0.15.

It is preferred that the zoom optical systems of the first to third embodiments further satisfy the following conditional expression (13):

$$0.05 < \Sigma G1/TLw < 0.15 \qquad (13),$$

where

ΣG1: Distance from the object-side surface of the lens disposed on the object side of the first lens group to the image-surface-side surface of the lens disposed on the image surface side of the first lens group, and TLw: Entire length of the zoom optical system in a wide-angle end state upon focusing on an infinity object.

The conditional expression (13) defines the total thickness of the first lens group as a ratio to the entire length of the zoom optical system in a wide-angle end state. By satisfying this conditional expression, both downsizing of the zoom optical system and realization of high optical performance can be achieved.

If the corresponding value of the conditional expression (13) exceeds the upper limit value of 0.15, it becomes difficult to favorably correct various aberrations such as the spherical aberration and the coma aberration. In order to ensure the effect of each embodiment, it is preferred that the upper limit value of the conditional expression (13) be a smaller value, such as 0.14, 0.13, 0.12, or 0.11.

If the corresponding value of the conditional expression (13) is below the lower limit value of 0.05, the total thickness of the first lens group becomes too thin to favorably correct the off-axis aberration. Alternatively, the entire length of the zoom optical system becomes too long to downsize the optical system. In order to ensure the effect of each embodiment, it is preferred that the lower limit value of the conditional expression (13) be a larger value, such as 0.06 or 0.07.

It is preferred that the zoom optical systems of the first to third embodiments further satisfy the following conditional expression (14):

$$0.30<(-f2)/f3<0.80 \quad (14),$$

where f2: Focal length of the second lens group, and f3: Focal length of the third lens group.

The conditional expression (14) defines the ratio between the focal length of the second lens group and the focal length of the third lens group. By satisfying this conditional expression, both downsizing of the zoom optical system and realization of high optical performance can be achieved.

If the corresponding value of the conditional expression (14) exceeds the upper limit value of 0.80, the refractive power of the second lens group becomes weak, making it difficult to downsize the optical system. In order to ensure the effect of each embodiment, it is preferred that the upper limit value of the conditional expression (14) be a smaller value, such as 0.77, 0.75, 0.74, or 0.73.

If the corresponding value of the conditional expression (14) is below the lower limit value of 0.30, it becomes difficult to favorably correct the curvature of field and astigmatic distance in the wide-angle end state, and to favorably correct the spherical aberration in the telephoto end state. In order to ensure the effect of each embodiment, it is preferred that the lower limit value of the conditional expression (14) be a larger value, such as 0.32 or 0.34.

Figure 14:
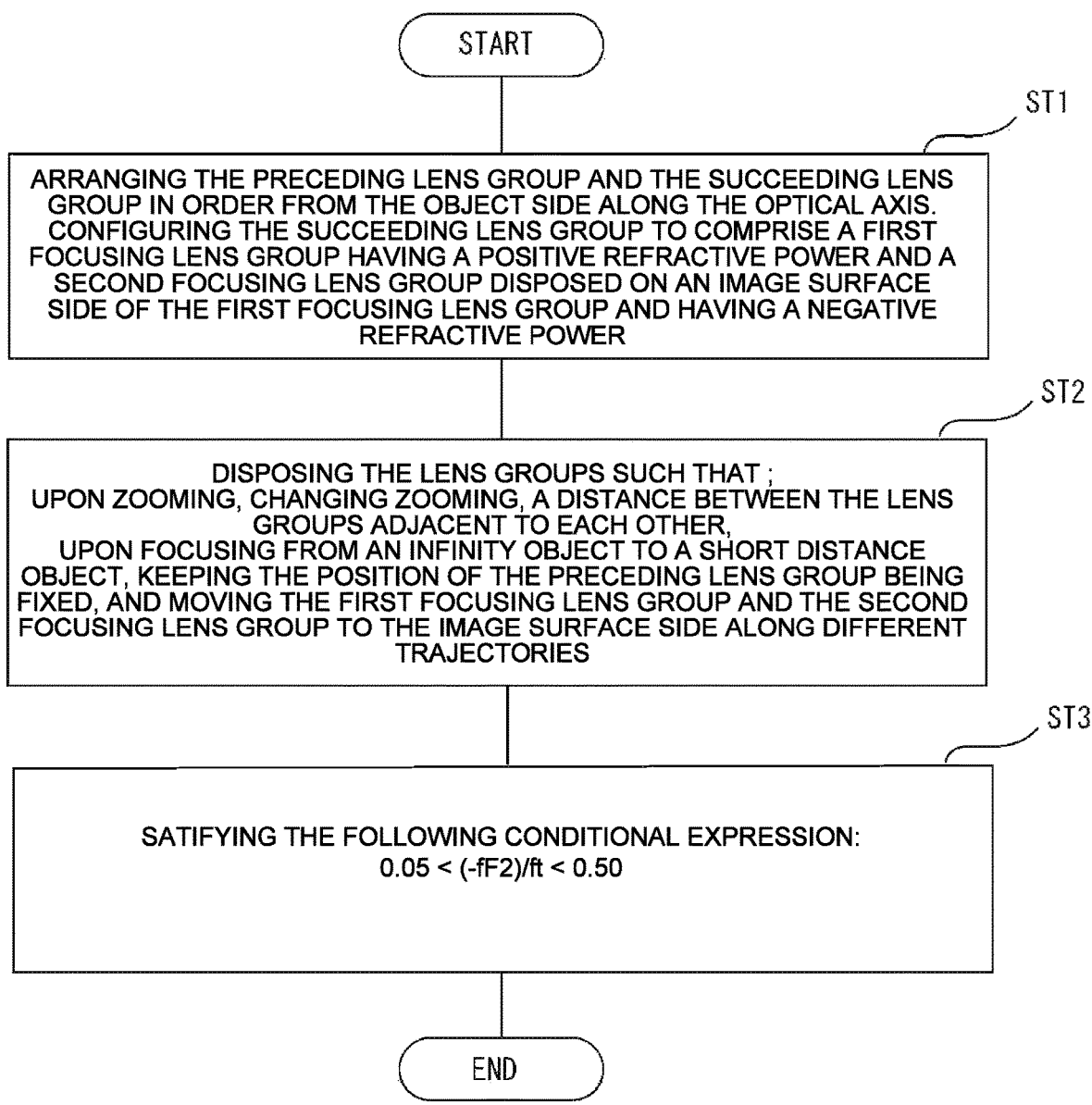
FIG. 14 shows a flowchart illustrating a method for manufacturing a zoom optical system according to a first embodiment.

Next, the method for manufacturing the zoom optical system of the first embodiment will be outline with reference to FIG. 14. The preceding lens group and the succeeding lens group are disposed side by side in order from the object side along the optical axis (ST1). The succeeding lens group includes a first focusing lens group having a positive refractive power and a second focusing lens group disposed on the image surface side of the first focusing lens group and having a negative refractive power. The lens groups to be disposed are configured such that, upon zooming, the distance between the lens groups adjacent to each other changes, and upon focusing from an infinity object to a short distance object, the position of the preceding lens group is fixed, and the first focusing lens group and the second focusing lens group move to the image surface along different trajectories (ST2). Moreover, the lens groups to be disposed are disposed in the lens barrel so as to satisfy the following conditional expression (ST3):

$$0.05<(-fF2)/ft<0.50,$$

where fF2: Focal length of the second focusing lens group, and ft: Focal length of the zoom optical system in a telephoto end state.

The zoom optical system manufactured by the foregoing procedure and the optical apparatus equipped with this zoom optical system have two focusing lens groups, wherein the second focusing lens group and the first focusing lens group clearly separate their roles, that is, the second focusing lens group performs the focusing and the first focusing lens group corrects aberrations upon focusing from an infinity object to a short distance object. For this reason, various aberrations such as the curvature of field, the spherical aberration, and the chromatic aberration can favorably be corrected, thereby effectively suppressing aberration fluctuations during focusing.

Figure 15:
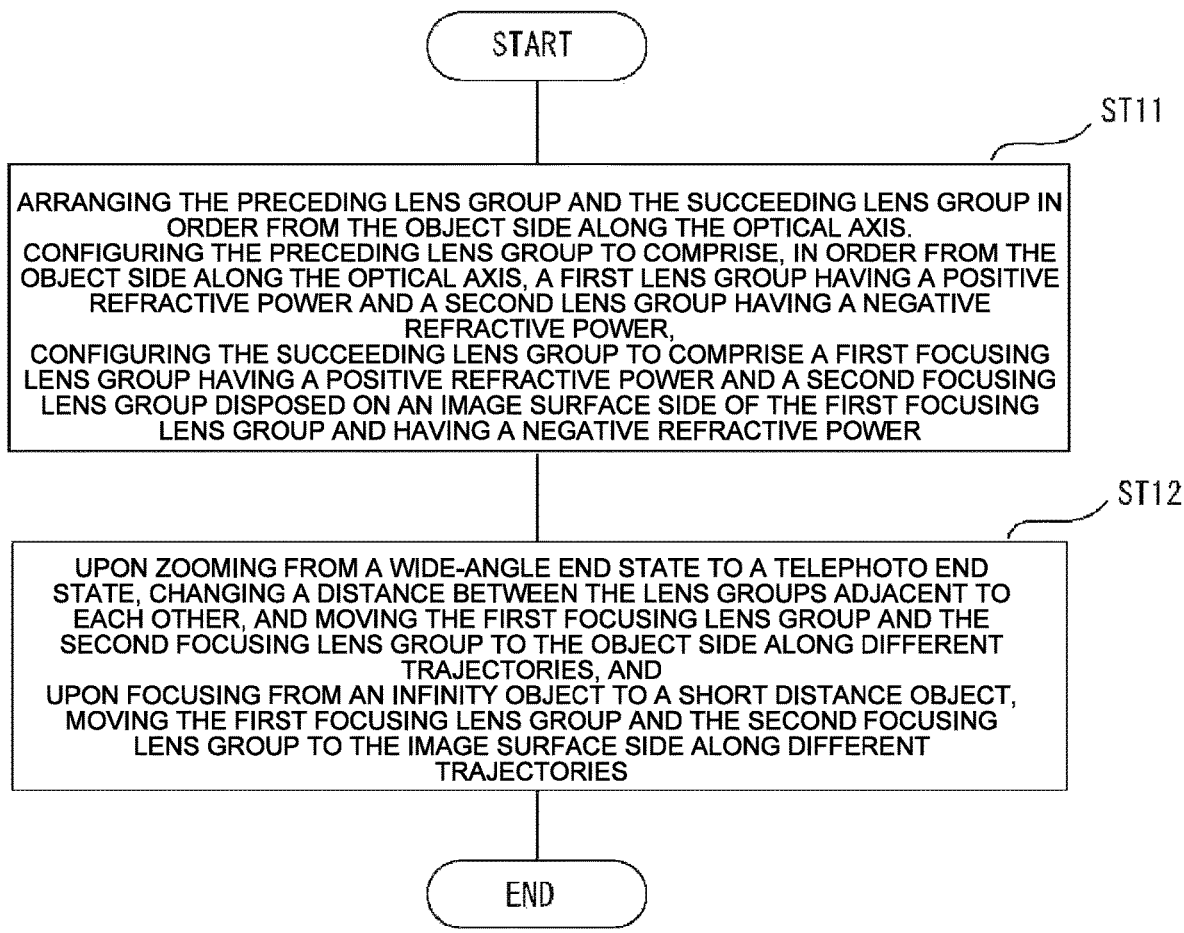
FIG. 15 shows a flowchart illustrating a method for manufacturing a zoom optical system according to a second embodiment.

Next, the method for manufacturing the zoom optical system of the second embodiment will be outline with reference to FIG. 15. The preceding lens group and the succeeding lens group are disposed in order from the object side along the optical axis (ST11). The preceding lens group includes, in order from the object side along the optical axis, a first lens group having a positive refractive power and a second lens group having a negative refractive power. The succeeding lens group includes a first focusing lens group having a positive refractive power and a second focusing lens group disposed on the image surface side of the first focusing lens group and having a negative refractive power. The lens groups are configured in such a manner that, upon zooming from a wide-angle end state to a telephoto end state, the distance between the lens groups adjacent to each other changes, and the first focusing lens group and the second focusing lens group move to the object side along different trajectories, and upon focusing from an infinity object to a short distance object, the first focusing lens group and the second focusing lens group move to the image surface side along different trajectories (ST12).

The zoom optical system manufactured by the foregoing procedure and the optical apparatus equipped with this zoom optical system have two focusing lens groups, wherein the second focusing lens group and the first focusing lens group clearly separate their roles, that is, the second focusing lens group performs the focusing and the first focusing lens group corrects aberrations upon focusing from an infinity object to a short distance object. For this reason, various aberrations such as the curvature of field, the spherical aberration, and the chromatic aberration can favorably be corrected, thereby effectively suppressing aberration fluctuations during focusing.

Next, the method for manufacturing the zoom optical system of the third embodiment will be outline with reference to FIG. 16. The preceding lens group and the succeeding lens group are disposed in order from the object side along the optical axis (ST21). The succeeding lens group includes a first focusing lens group having a positive refractive power and a second focusing lens group disposed on the image surface side of the first focusing lens group and having a negative refractive power. The lens groups are configured in such a manner that, upon zooming, the distance between the lens groups adjacent to each other changes, and upon focusing from an infinity object to a short distance object, the position of the preceding lens group is fixed, and the first focusing lens group and the second focusing lens group move to the image surface side along different trajectories (ST22). The second focusing lens group includes one positive lens and one negative lens disposed side by side in order from the object side (ST23).

The zoom optical system manufactured by the foregoing procedure and the optical apparatus equipped with this zoom optical system have two focusing lens groups, wherein the second focusing lens group and the first focusing lens group clearly separate their roles, that is, the second focusing lens group performs the focusing and the first focusing lens group corrects aberrations upon focusing from an infinity object to a short distance object. For this reason, various aberrations such as the curvature of field, the spherical aberration, and the chromatic aberration can favorably be corrected, thereby effectively suppressing aberration fluctuations during focusing.

EXAMPLES

The zoom optical systems of the first to third embodiments will be further described hereinafter with reference to four numerical examples from Examples 1 to 4. First, how to read the figures and tables referred to in the explanation of each example will be described. FIGS. 1, 4, 7 and 10 are diagrams showing the lens configuration and operation of the zoom optical system in each embodiment. In the center of each diagram, the arrangement of the lens groups is shown by a cross-sectional view. In the lower part of each diagram, moving trajectories along the optical axis of a lens group G and an aperture stop S upon zooming (magnifying) from a wide-angle end state (W) to a telephoto end state (T) are shown by arrows. In the upper part of each diagram, the moving direction of the focusing lens group upon focusing from an infinity object to a close-range object is indicated by an arrow together with the words "focusing" and "∞."

In these diagrams, each lens group is represented by a combination of a reference numeral G and a number, and each lens is represented by a combination of a reference numeral L and a number. In the present specification, in order to prevent complication caused by an increase in the number of reference numerals, numbers are applied in each example. Therefore, although the combinations of the same reference numerals and numbers may be used in a plurality of examples, this does not mean that the configurations represented by said combinations of reference numerals and numbers are the same.

FIGS. 2A-2C, 5A-5C, 8A-8C, and 11A-11C show various aberrations of the zoom optical system according to each example upon focusing on an infinity object, where FIGS. 2A, 5A, 8A, and 11A show various aberrations in a wide-angle end state, FIGS. 2B, 5B, 8B, and 11B show various aberrations in an intermediate focal length state, and FIGS. 2C, 5C, 8C, and 11C show various aberrations in a telephoto end state. In addition, FIGS. 3A-3C, 6A-6C, 9A-9C, and 12A-12C show various aberrations of the zoom optical system according to each example upon focusing on a close-range object, where FIGS. 3A, 6A, 9A, and 12A show various aberrations in a wide-angle end state, FIGS. 3B, 6B, 9B, and 12B show various aberrations in an intermediate focal length state, and FIGS. 3C, 6C, 9C, and 12C show various aberrations in a telephoto end state. In these diagrams, FNO indicates an F number, NA indicates a numerical aperture, and Y indicates an image height. The spherical aberration diagram shows the value of the F number or numerical aperture corresponding to the maximum aperture, the astigmatism diagram and the distortion diagram show the maximum image height, and the lateral aberration diagram shows the value of each image height. The alphabet "d" indicates the d-line ($\lambda$=587.6 nm), and "g" the g-line ($\lambda$=435.8 nm). In the astigmatism diagram, the solid line indicates the sagittal image surface and the broken line indicates the meridional image surface. The distortion diagram shows the distortion aberration based on the d-line, and the diagram of the chromatic aberration of magnification shows the chromatic aberration of magnification based on the g-line.

Subsequently, the table used for explaining each example will be described. In the table [General Data], f is the focal length of the entire lens system, FNO is the F number, 2$\omega$ is the angle of view (unit is ° (degrees), and $\omega$ is the half angle of view), and Y is the maximum image height. TL indicates the distance obtained by adding BF to the distance from the frontmost surface of the lens to the end surface of the lens on the optical axis when focusing on an infinity object, where BF is the air equivalent distance (back focusing) from the end surface of the lens to the image surface I on the optical axis when focusing on an infinity object.

In the table [Lens Data], the surface numbers indicate the order of the optical surfaces from the object side along the traveling direction of the light beam, where R is the radius of curvature of each optical surface (the surface whose center of curvature is located on the image surface side is a positive value), D is the surface distance on the optical axis from each optical surface to the next optical surface (or image surface), nd is the refractive index of the material of the optical member with respect to the d-line, and vd is the Abbe number based on the d-line of the material of the optical member. The surface distance (Di) means that the distance from a surface i to the next surface is variable. S indicates an aperture stop, and "∞" of the radius of curvature indicates a surface or an aperture. The description of refractive index nd of air=1.00000 is omitted.

The table [Lens Group Data] shows the first surface (the surface closest to the object side) and the focal length of each lens group.

The table [Variable Distance Data] shows the surface distance to the next surface at the surface number i in which the surface distance is (Di) in the table showing [Lens Data]. The left side shows the surface distance upon focusing on an infinity object, and the right side shows the surface distance upon focusing on a close-range object.

Since "mm" is generally used as the unit of the focal length f, the radius of curvature R, the surface distance D, and other lengths, the unit of length is set as "mm" in each table in the present specification. However, since the zoom optical system can achieve the same optical performance even if it is proportionally expanded or downsized, the unit of length is not necessarily limited to "mm."

The explanations of the figures and tables so far are common to all of the examples, and the overlapping explanations below are omitted.

Example 1

Figure 1:
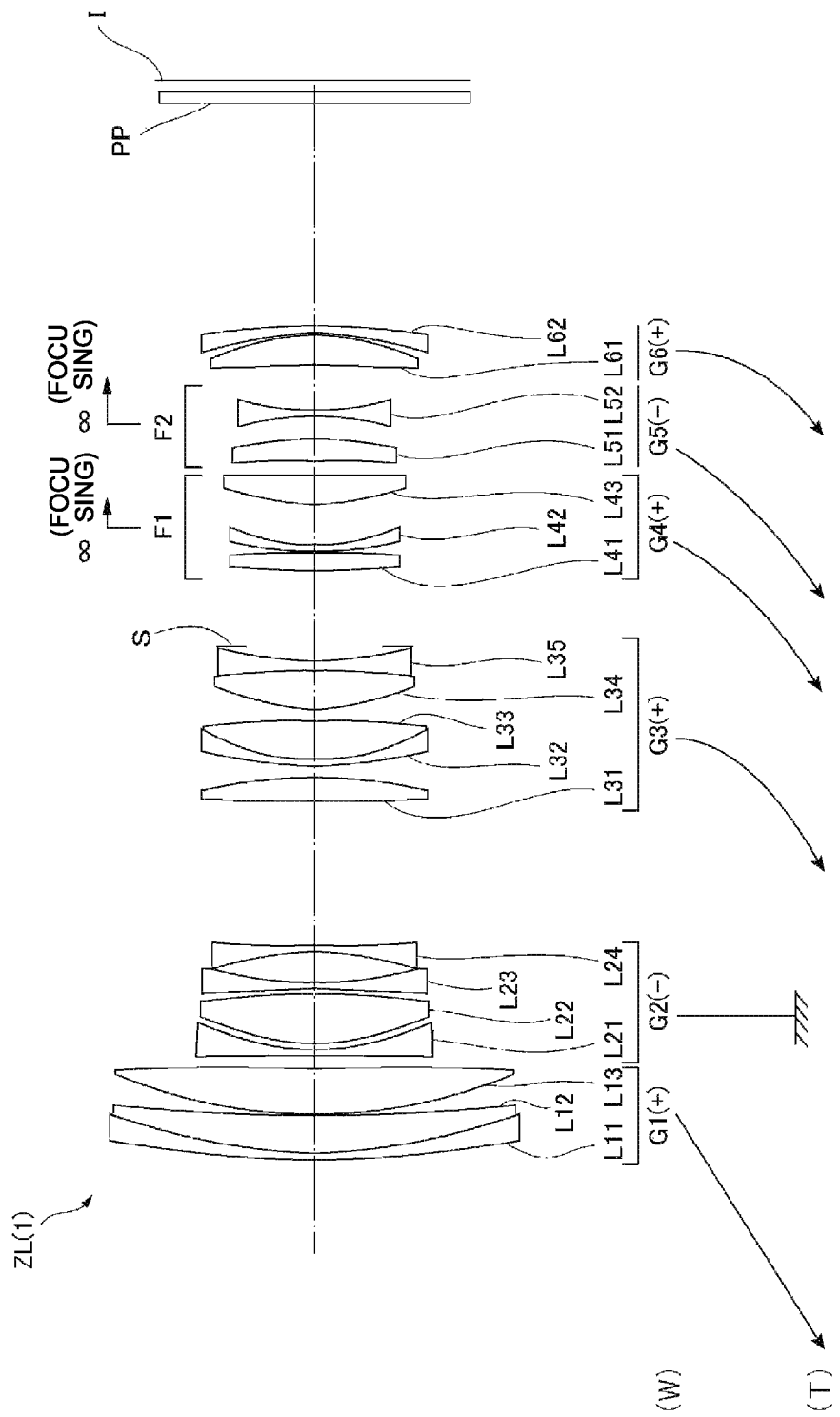
FIG. 1 shows a diagram illustrating a lens configuration of a zoom optical system according to Example 1.

Example 1 will be described using FIGS. 1, 2A-2C, and 3A-3C, and Table 1. FIG. 1 is a diagram showing a lens configuration of a zoom optical system ZL (1) according to Example 1. The zoom optical system ZL (1) includes, in order from an object side, a first lens group G1 having a positive refractive power, a second lens group G2 having a negative refractive power, a third lens group G3 having a positive refractive power, an aperture stop S, a fourth lens group G4 having a positive refractive power, a fifth lens group G5 having a negative refractive power, and a sixth lens group G6 having a positive refractive power. The image surface I is located behind the sixth lens group G6. The fourth to sixth lens groups have a triplet structure with unevenness, which makes it easy to suppress aberration fluctuations during zooming. In the present example, the fourth lens group G4 functions as a first focusing lens group F1, and the fifth lens group G5 functions as a second focusing lens group F2. The second focusing lens group also functions as a teleconverter that expands the focal length of the first to fourth lens groups.

The first lens group G1, the third lens group G3, the fourth lens group G4, the fifth lens group G5, and the sixth lens group G6 move along the trajectories indicated by the arrows shown in the lower part of FIG. 1 when zooming from the wide-angle end state (W) to the telephoto end state (T). As a result, the distance between the adjacent lens groups changes, and the photographing magnification is changed (zooming is performed). The second lens group G2 is fixed and does not move upon zooming. When focusing from an infinite object to a short distance object, the fourth lens group G4 and the fifth lens group G5 move to the image surface side along different trajectories as shown by the arrows in the upper part of FIG. 1.

The first lens group G1 includes a cemented positive lens with a negative meniscus lens L11 having a convex surface facing the object side and a positive meniscus lens L12 having a convex surface facing the object side, and a biconvex positive lens L13. The second lens group G2 includes a biconcave negative lens L21, a biconvex positive lens L22, a biconcave negative lens L23, and a biconcave negative lens L24. The third lens group G3 includes a biconvex positive lens L31, a cemented positive lens with a negative meniscus lens L32 having a convex surface facing the object side and a biconvex positive lens L33, and a cemented positive lens with a biconvex positive lens L34 and a biconcave negative lens L35.

The fourth lens group G4 includes a biconvex positive lens L41, a negative meniscus lens L42 having a convex surface facing the object side, and a positive meniscus lens L43 having a convex surface facing the object side. The fifth lens group G5 includes a positive meniscus lens L51 having a concave surface facing the object side and a biconcave negative lens L52.

The sixth lens group G6 includes a positive meniscus lens L61 having a concave surface facing the object side and a negative meniscus lens L62 having a concave surface facing the object side. Further, a parallel flat plate PP is disposed in front of the image surface I.

Table 1 lists the values of the data of the zoom optical system according to Example 1.

TABLE 1

[General Data]
Zooming ratio = 2.691

|  | W | M | T |
| --- | --- | --- | --- |
| f | 72.10 | 102.64 | 194.00 |
| FNO | 4.10 | 4.10 | 4.11 |
| 2ω | 33.77 | 23.58 | 12.36 |
| Ymax | 21.60 | 21.60 | 21.60 |
| TL | 167.56 | 185.12 | 204.48 |
| BF | 37.76 | 40.23 | 51.42 |

[Lens Data]

| Surface Number | R | D | nd | νd |
| --- | --- | --- | --- | --- |
| Object Surface | ∞ |  |  |  |
| 1 | 144.8366 | 1.00 | 1.8000 | 29.84 |
| 2 | 73.1116 | 5.85 | 1.5952 | 67.73 |
| 3 | 302.7125 | 0.10 |  |  |
| 4 | 68.5085 | 7.10 | 1.4970 | 81.14 |
| 5 | −2151.2492 | (D5) |  |  |
| 6 | −1656.3623 | 1.00 | 1.7200 | 46.02 |
| 7 | 33.5940 | 1.06 |  |  |
| 8 | 34.1723 | 7.56 | 1.8414 | 24.56 |
| 9 | −119.9733 | 0.78 |  |  |
| 10 | −139.3696 | 1.00 | 1.8062 | 40.91 |
| 11 | 53.2947 | 4.69 |  |  |
| 12 | −43.3327 | 1.00 | 1.7620 | 40.10 |
| 13 | 295.7341 | (D13) |  |  |
| 14 | 265.1264 | 3.48 | 1.6400 | 60.08 |
| 15 | −69.2515 | 2.00 |  |  |
| 16 | 60.6882 | 1.00 | 1.8010 | 34.92 |
| 17 | 29.8803 | 5.94 | 1.6400 | 60.08 |
| 18 | −155.7130 | 2.00 |  |  |
| 19 | 30.4340 | 5.81 | 1.4875 | 70.32 |
| 20 | −100.4347 | 1.59 | 1.8061 | 40.93 |
| 21 | 46.2910 | 2.11 |  |  |
| 22(S) | 0.0000 | (D22) |  |  |
| 23 | 99.4135 | 2.72 | 1.6204 | 60.29 |
| 24 | −317.0281 | 0.27 |  |  |
| 25 | 51.7395 | 1.00 | 1.8850 | 30.16 |
| 26 | 27.3631 | 6.31 |  |  |
| 27 | 32.8360 | 4.31 | 1.7200 | 43.69 |
| 28 | 3964.4455 | (D28) |  |  |
| 29 | −295.2690 | 3.45 | 1.7618 | 26.52 |
| 30 | −47.8221 | 3.63 |  |  |
| 31 | −37.3306 | 1.00 | 1.7725 | 49.62 |
| 32 | 41.6899 | (D32) |  |  |
| 33 | −197.5318 | 4.59 | 1.7645 | 49.10 |
| 34 | −33.3333 | 0.41 |  |  |
| 35 | −36.7436 | 1.00 | 1.6129 | 37.00 |
| 36 | −102.1283 | (D36) |  |  |
| 37 | 0.0000 | 1.60 | 1.5168 | 64.13 |
| 38 | 0.0000 | 2.000 |  |  |
| Image Surface | ∞ |  |  |  |

[Lens Group Data]

| Group | First surface | Focal length |
| --- | --- | --- |
| 1 | 1 | 122.414 |
| 2 | 6 | −31.567 |
| 3 | 14 | 44.395 |
| 4 | 23 | 63.962 |
| 5 | 29 | −41.417 |
| 6 | 33 | 116.512 |

[Variable Distance Data]

|  | Infinity | | | Close-range | | |
| --- | --- | --- | --- | --- | --- | --- |
|  | W | M | T | W | M | T |
| F | 72.100 | 102.642 | 194.000 | 67.277 | 91.500 | 139.931 |
| D5 | 2.000 | 19.657 | 39.000 | 2.000 | 19.656 | 39.000 |
| D13 | 22.402 | 17.047 | 2.100 | 22.402 | 17.047 | 2.100 |
| D22 | 11.833 | 8.529 | 8.879 | 14.761 | 11.609 | 10.640 |
| D28 | 2.330 | 1.793 | 2.000 | 4.318 | 5.420 | 13.231 |
| D32 | 6.916 | 13.556 | 16.771 | 2.000 | 6.848 | 3.780 |
| D36 | 34.707 | 37.174 | 48.360 | 34.708 | 37.174 | 48.360 |

Figure 2B:
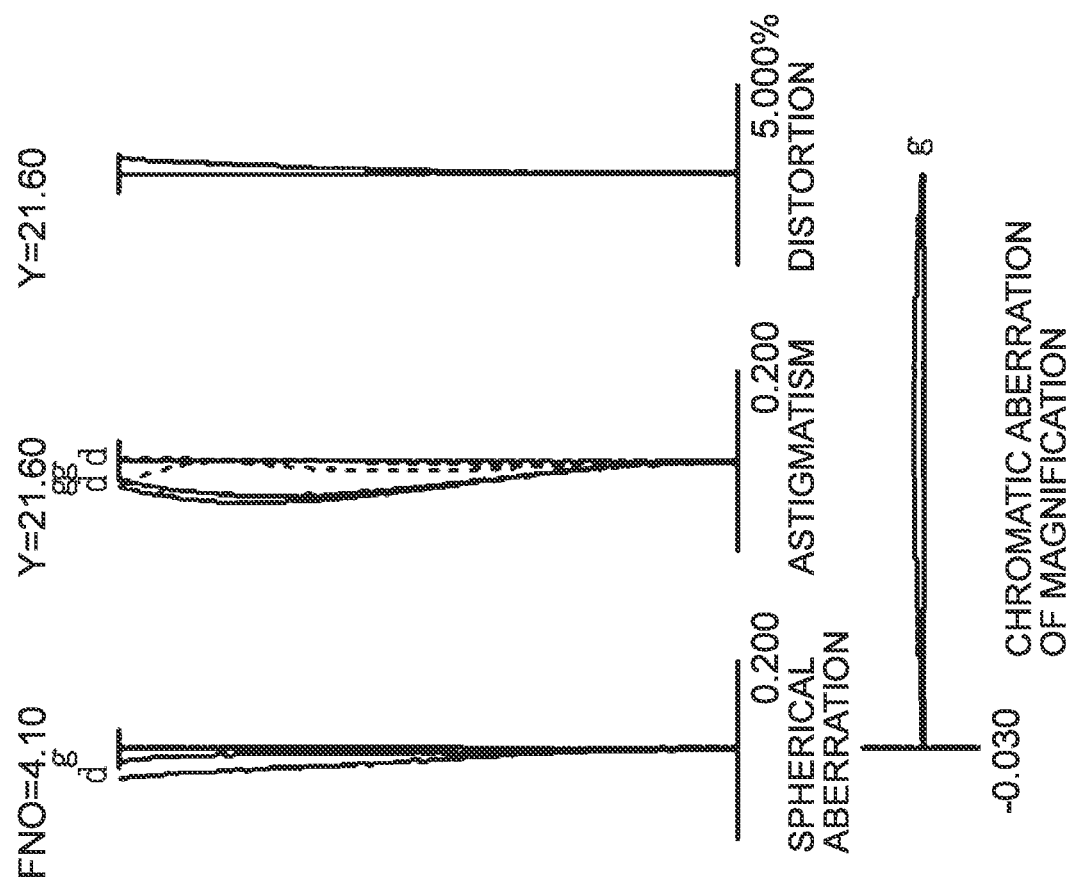

FIGS. 2A-2C show various aberration values of the zoom optical system according to Example 1 in a focusing-on-an-infinity-object state, and FIGS. 3A-3C show various aberration values of the zoom optical system according to Example 1 in a focusing-on-a-close-range-object state. In these diagrams, FIGS. 2A and 3A show various aberration values in a wide-angle end state, FIGS. 2B and 3B show various aberration values in an intermediate focal length state, and FIGS. 2C and 3C show various aberration values in a telephoto end state. From each aberration diagram, it is understood that the zoom optical system according to Example 1 can favorably correct various aberrations in focusing from an infinity object to a short distance object in the entire range from the wide-angle end state to the telephoto end state, thereby effectively suppressing aberration fluctuations.

Example 2

Example 2 will be described using FIGS. 4, 5A-5C, and 6A-6C, and Table 2. FIG. 4 is a diagram showing a lens configuration of a zoom optical system ZL (2) according to Example 2. The zoom optical system ZL (2) includes, in order from the object side, a first lens group G1 having a positive refractive power, a second lens group G2 having a negative refractive power, a third lens group G3 having a positive refractive power, an aperture stop S, a fourth lens group G4 having a positive refractive power, a fifth lens group G5 having a negative refractive power, and a sixth lens group G6 having a positive refractive power. The image surface I is located behind the sixth lens group G6. The fourth to sixth lens groups have a triplet structure with unevenness, which makes it easy to suppress aberration fluctuations during zooming. In the present example, the fourth lens group G4 functions as the first focusing lens group F1, and the fifth lens group G5 functions as the second focusing lens group F2. The second focusing lens group also functions as a teleconverter that expands the focal length of the first to fourth lens groups.

The first lens group G1, the third lens group G3, the fourth lens group G4, the fifth lens group G5, and the sixth lens group G6 move along the trajectories indicated by the arrows shown in the lower part of FIG. 4 when shifting from the wide-angle end state (W) to the telephoto end state (T). As a result, the distance between the adjacent lens groups changes, and the photographing magnification is changed (zooming is performed). The second lens group G2 is fixed and does not move upon zooming. When focusing from an infinite object to a short distance object, the fourth lens group G4 and the fifth lens group G5 move to the image surface side along different trajectories as shown by the arrows in the upper part of FIG. 4.

The first lens group G1 includes a cemented positive lens with a negative meniscus lens L11 having a convex surface facing the object side and a positive meniscus lens L12 having a convex surface facing the object side, and a positive meniscus lens L13 having a convex surface facing the object side. The second lens group G2 includes a negative meniscus lens L21 having a convex surface facing the object side, a biconvex positive lens L22, a biconcave negative lens L23, and a biconcave negative lens L24. The third lens group G3 includes a biconvex positive lens L31, a cemented positive lens with a negative meniscus lens L32 having a convex surface facing the object side and a biconvex positive lens L33, and a cemented positive lens with a biconvex positive lens L34 and a biconcave negative lens L35.

The fourth lens group G4 includes a biconvex positive lens L41, a negative meniscus lens L42 having a convex surface facing the object side, and a biconvex positive lens L43. The fifth lens group G5 includes a positive meniscus lens L51 having a concave surface facing the object side and a biconcave negative lens L52.

The sixth lens group G6 includes a positive meniscus lens L61 having a concave surface facing the object side and a negative meniscus lens L62 having a concave surface facing the object side. Further, a parallel flat plate PP is disposed in front of the image surface I.

Table 2 lists the values of the data of the zoom optical system according to Example 2.

TABLE 2

[General Data]
Zooming ratio = 2.691

|  | W | M | T |
|---|---|---|---|
| f | 72.10 | 105.00 | 194.00 |
| FNO | 4.10 | 4.10 | 4.10 |
| 2ω | 33.64 | 22.98 | 12.30 |
| Ymax | 21.60 | 21.60 | 21.60 |
| TL | 167.32 | 186.91 | 205.27 |
| BF | 37.23 | 37.15 | 37.11 |

[Lens Data]

| Surface Number | R | D | nd | νd |
|---|---|---|---|---|
| Object Surface | ∞ |  |  |  |
| 1 | 164.2107 | 1.00 | 1.7950 | 28.69 |
| 2 | 81.6916 | 5.44 | 1.5932 | 67.90 |
| 3 | 541.7710 | 0.10 |  |  |
| 4 | 64.6180 | 6.69 | 1.4970 | 81.61 |
| 5 | 1556.5885 | (D5) |  |  |
| 6 | 372.6279 | 1.00 | 1.7200 | 46.02 |
| 7 | 31.3950 | 0.58 |  |  |
| 8 | 32.1189 | 8.32 | 1.7847 | 25.64 |
| 9 | −93.6053 | 0.11 |  |  |
| 10 | −119.9230 | 1.00 | 1.7725 | 49.62 |
| 11 | 44.7568 | 5.56 |  |  |
| 12 | −37.2692 | 1.00 | 1.8061 | 40.93 |
| 13 | 517.4010 | (D13) |  |  |
| 14 | 134.2064 | 4.10 | 1.6700 | 57.33 |
| 15 | −74.3373 | 2.00 |  |  |
| 16 | 55.0428 | 1.00 | 1.8010 | 34.92 |
| 17 | 27.3081 | 6.05 | 1.6400 | 60.19 |
| 18 | −146.5253 | 2.00 |  |  |
| 19 | 40.9804 | 5.06 | 1.4875 | 70.32 |
| 20 | −61.4029 | 1.34 | 1.8061 | 40.97 |
| 21 | 64.3603 | 6.64 |  |  |
| 22(S) | 0.0000 | (D22) |  |  |
| 23 | 76.0467 | 2.62 | 1.6700 | 47.23 |
| 24 | −457.2754 | 0.13 |  |  |
| 25 | 93.1674 | 1.00 | 1.9020 | 25.10 |
| 26 | 31.2834 | 4.96 |  |  |
| 27 | 37.8776 | 3.87 | 1.8919 | 37.13 |
| 28 | −3745.9359 | (D28) |  |  |
| 29 | −78.4678 | 2.39 | 1.8467 | 23.78 |
| 30 | −44.3923 | 6.95 |  |  |
| 31 | −34.1777 | 1.00 | 1.7725 | 49.62 |
| 32 | 53.9288 | (D32) |  |  |
| 33 | −268.3415 | 4.47 | 1.7550 | 52.32 |
| 34 | −47.4541 | 0.10 |  |  |
| 35 | −47.1341 | 1.00 | 1.6398 | 34.47 |
| 36 | −52.0094 | (D36) |  |  |
| 37 | 0.0000 | 1.60 | 1.5168 | 63.88 |
| 38 | 0.0000 | 1.000 |  |  |
| Image Surface | ∞ |  |  |  |

[Lens Group Data]

| Group | First surface | Focal length |
|---|---|---|
| 1 | 1 | 116.302 |
| 2 | 6 | −27.897 |
| 3 | 14 | 42.018 |
| 4 | 23 | 63.113 |
| 5 | 29 | −37.306 |
| 6 | 33 | 83.793 |

TABLE 2-continued

[Variable Distance]

| | Infinity | | | Close-range | | |
|---|---|---|---|---|---|---|
| | W | M | T | W | M | T |
| F | 72.100 | 105.000 | 194.000 | 66.728 | 93.257 | 133.735 |
| D5 | 2.000 | 21.665 | 40.000 | 2.000 | 21.664 | 39.999 |
| D13 | 18.985 | 14.768 | 2.100 | 18.986 | 14.768 | 2.100 |
| D22 | 10.417 | 6.804 | 12.049 | 13.730 | 9.913 | 16.049 |
| D28 | 3.010 | 2.588 | 4.969 | 5.345 | 6.845 | 18.954 |
| D32 | 7.649 | 15.901 | 20.943 | 2.000 | 8.534 | 2.958 |
| D36 | 35.170 | 35.093 | 35.120 | 35.170 | 35.094 | 35.120 |

Figure 5A:
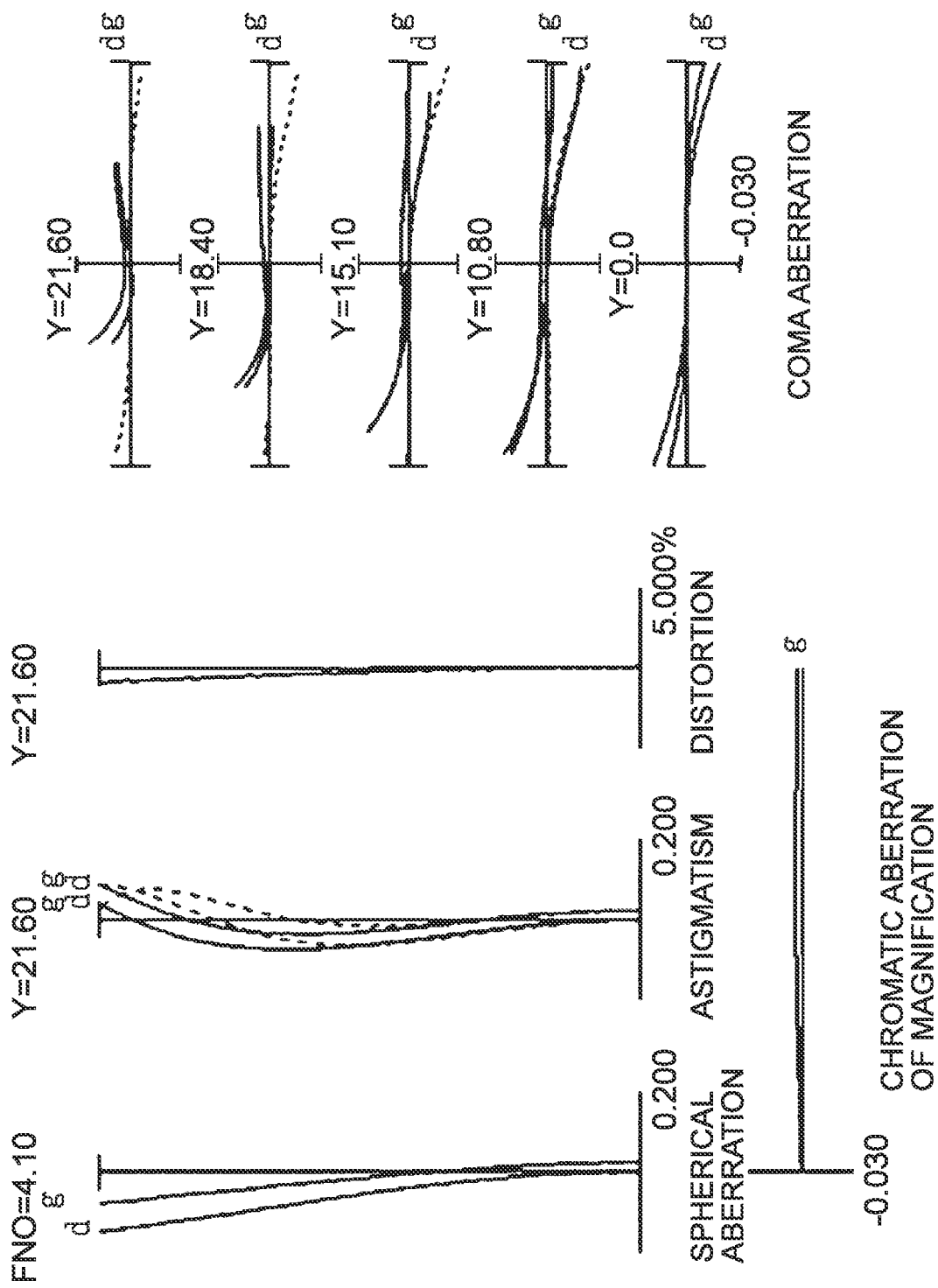
Figure 6B:
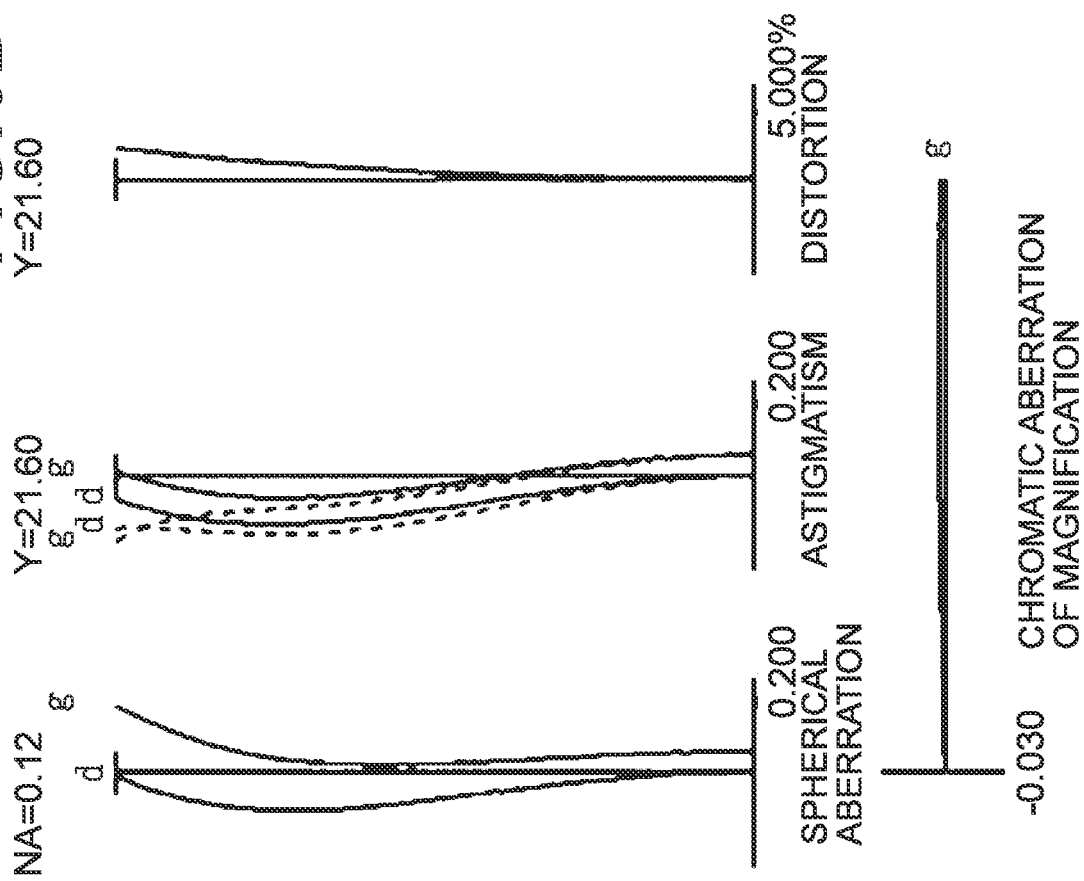
Figure 6C:
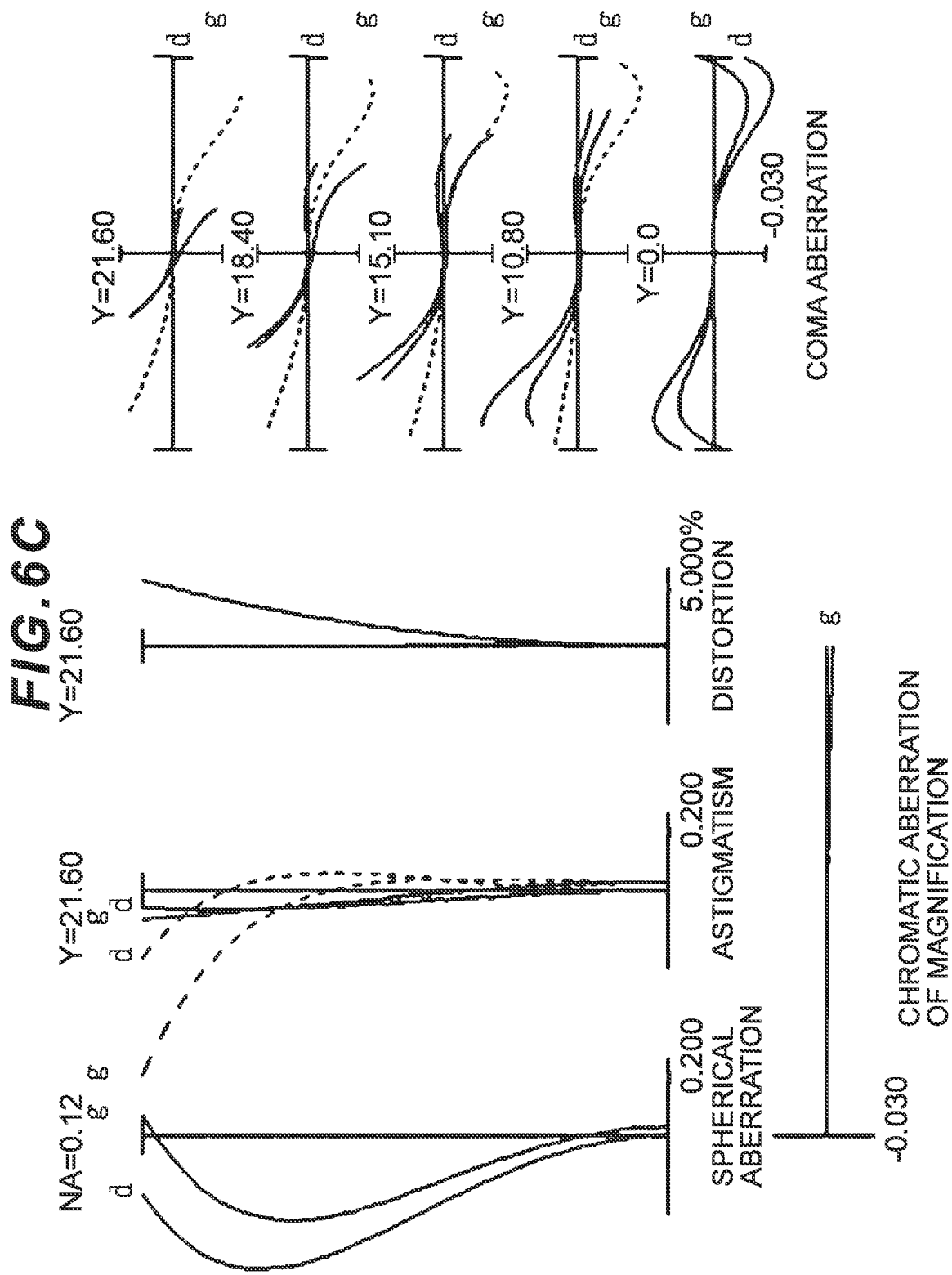

FIGS. 5A-5C show various aberration values of the zoom optical system according to Example 2 in a focusing-on-an-infinity-object state, and FIGS. 6A-6C show various aberration values of the zoom optical system according to Example 2 in a focusing-on-a-close-range-object state. In these diagrams, FIGS. 5A and 6A show various aberration values in a wide-angle end state, FIGS. 5B and 6B show various aberration values in an intermediate focal length state, and FIGS. 5C and 6C show various aberration values in a telephoto end state. From each aberration diagram, it is understood that the zoom optical system according to Example 2 can favorably correct various aberrations in focusing from an infinity object to a short distance object in the entire range from the wide-angle end state to the telephoto end state, thereby effectively suppressing aberration fluctuations.

Example 3

Example 3 will be described using FIGS. 7, 8A-8C, and 9A-9C, and Table 3. FIG. 7 is a diagram showing a lens configuration of a zoom optical system ZL (3) according to Example 3. The zoom optical system ZL (3) includes, in order from the object side, a first lens group G1 having a positive refractive power, a second lens group G2 having a negative refractive power, a third lens group G3 having a positive refractive power, a fourth lens group G4 having a positive refractive power, an aperture stop S, a fifth lens group G5 having a positive refractive power, a sixth lens group G6 having a negative refractive power, a seventh lens group G7 having a positive refractive power, and an eighth lens group G8 having a negative refractive power. The image surface I is located behind the eighth lens group G8.

The fifth to seventh lens groups have a triplet structure with unevenness, which makes it easy to suppress aberration fluctuations upon zooming. Also, since the eighth lens group having a negative refractive power is disposed behind the seventh lens group, the structure is close to the telephoto structure as a whole, where back focusing or the effect of shortening the entire length of the optical system can be easily obtained. In the present example, the fifth lens group G5 functions as the first focusing lens group F1, and the sixth lens group G6 functions as the second focusing lens group F2. The second focusing lens group also functions as a teleconverter that expands the focal length of the first to fifth lens groups.

The second lens group G2, the third lens group G3, the fifth lens group G5, the sixth lens group G6, and the eighth lens group G8 move along the trajectories indicated by the arrows shown in the lower part of FIG. 7 upon zooming from the wide-angle end state (W) to the telephoto end state (T). As a result, the distance between the adjacent lens groups changes, and the photographing magnification is changed (zooming is performed). The first lens group G1, the fourth lens group G4, and the seventh lens group G7 are fixed and do not move upon zooming. When focusing from an infinite object to a short distance object, the fifth lens group G5 and the sixth lens group G6 move to the image surface side along different trajectories as shown by the arrows in the upper part of FIG. 7.

The first lens group G1 includes a cemented positive lens with a negative meniscus lens L11 having a convex surface facing the object side and a biconvex positive lens L12, and a positive meniscus lens L13 having a convex surface facing the object side. The second lens group G2 includes a negative meniscus lens L21 having a convex surface facing the object side, a cemented negative lens with a biconcave negative lens L22 and a biconvex positive lens L23, and a biconcave negative lens L24. The third lens group G3 includes a positive meniscus lens L31 having a concave surface facing the object side. The fourth lens group G4 includes a biconvex positive lens L41, and a cemented positive lens with a biconvex positive lens L42 and a biconcave negative lens L43.

The fifth lens group G5 includes a negative meniscus lens L51 having a convex surface facing the object side and a biconvex positive lens L52. The sixth lens group G6 includes a cemented negative lens with a biconvex positive lens L61 and a biconcave negative lens L62.

The seventh lens group G7 includes a negative meniscus lens L71 having a convex surface facing the object side and a biconvex positive lens L72. The eighth lens group G8 includes a biconcave negative lens L81. Further, a parallel flat plate PP is disposed in front of the image surface I.

Table 3 lists the values of the data of the zoom optical system according to Example 3.

TABLE 3

[General Data]
Zooming ratio = 2.708

| | W | M | T |
|---|---|---|---|
| f | 72.01 | 131.40 | 195.00 |
| FNO | 4.10 | 4.10 | 4.11 |
| 2ω | 33.51 | 18.53 | 12.50 |
| Ymax | 21.60 | 21.60 | 21.60 |
| TL | 190.10 | 191.04 | 190.02 |
| BF | 37.67 | 42.70 | 46.99 |

[Lens Data]

| Surface Number | R | D | nd | vd |
|---|---|---|---|---|
| Object Surface | ∞ | | | |
| 1 | 90.2355 | 1.00 | 1.9500 | 29.37 |
| 2 | 60.7702 | 6.89 | 1.4970 | 81.64 |
| 3 | −2196.2816 | 0.10 | | |
| 4 | 51.3148 | 10.01 | 1.4970 | 81.61 |
| 5 | 179.5132 | (D5) | | |
| 6 | 434.7890 | 1.49 | 1.8503 | 32.35 |
| 7 | 29.2567 | 6.81 | | |
| 8 | −72.2823 | 1.00 | 1.4970 | 81.64 |
| 9 | 34.2350 | 7.14 | 2.0007 | 25.46 |
| 10 | −94.3337 | 1.07 | | |
| 11 | −56.0853 | 1.00 | 1.8061 | 33.34 |
| 12 | 165.1965 | (D12) | | |
| 13 | −248.3690 | 3.29 | 1.7000 | 48.10 |
| 14 | −52.8624 | (D14) | | |
| 15 | 89.5312 | 3.40 | 1.5168 | 64.13 |
| 16 | −155.4452 | 0.10 | | |
| 17 | 36.4241 | 5.38 | 1.4875 | 70.32 |
| 18 | −64.2538 | 1.00 | 2.0010 | 29.12 |
| 19 | 89.8281 | 1.77 | | |
| 20(S) | 0.0000 | (D20) | | |

TABLE 3-continued

| | | | | |
|---|---|---|---|---|
| 21 | 73.1095 | 1.00 | 1.7995 | 42.09 |
| 22 | 54.6786 | 0.10 | | |
| 23 | 51.1000 | 4.20 | 1.4970 | 81.64 |
| 24 | −68.2409 | (D24) | | |
| 25 | 99.5195 | 4.17 | 1.7847 | 25.64 |
| 26 | −37.0958 | 2.83 | 1.8485 | 43.79 |
| 27 | 30.2592 | (D27) | | |
| 28 | 278.5010 | 1.00 | 1.7174 | 29.57 |
| 29 | 51.0864 | 3.14 | | |
| 30 | 54.9583 | 6.33 | 1.7550 | 52.33 |
| 31 | −46.7106 | (D31) | | |
| 32 | −69.7842 | 1.00 | 1.8340 | 37.18 |
| 33 | 306.8074 | (D33) | | |
| 34 | 0.0000 | 1.60 | 1.5168 | 63.88 |
| 35 | 0.0000 | 1.000 | | |
| Image Surface | ∞ | | | |

[Lens Group Data]

| Group | First surface | Focal length |
|---|---|---|
| 1 | 1 | 96.608 |
| 2 | 6 | −35.022 |
| 3 | 13 | 95.276 |
| 4 | 15 | 199.774 |
| 5 | 21 | 75.812 |
| 6 | 25 | −47.481 |
| 7 | 28 | 51.745 |
| 8 | 32 | −68.087 |

[Variable Distance Data]

| | Infinity | | | Close-range | | |
|---|---|---|---|---|---|---|
| | W | M | T | W | M | T |
| F | 72.010 | 131.396 | 195.000 | 67.773 | 110.730 | 138.226 |
| D5 | 2.678 | 23.180 | 35.000 | 2.678 | 23.180 | 35.000 |
| D12 | 34.322 | 15.720 | 2.000 | 34.322 | 15.720 | 2.000 |
| D14 | 2.100 | 0.200 | 2.100 | 2.100 | 0.200 | 2.100 |
| D20 | 12.892 | 3.238 | 2.000 | 14.414 | 4.678 | 4.082 |
| D24 | 3.423 | 5.836 | 2.248 | 5.401 | 11.525 | 13.631 |
| D27 | 6.791 | 14.033 | 18.859 | 3.291 | 6.903 | 5.394 |
| D31 | 14.888 | 9.803 | 5.493 | 14.889 | 9.803 | 5.493 |
| D33 | 35.176 | 40.197 | 44.490 | 35.176 | 40.197 | 44.490 |

Figure 8B:
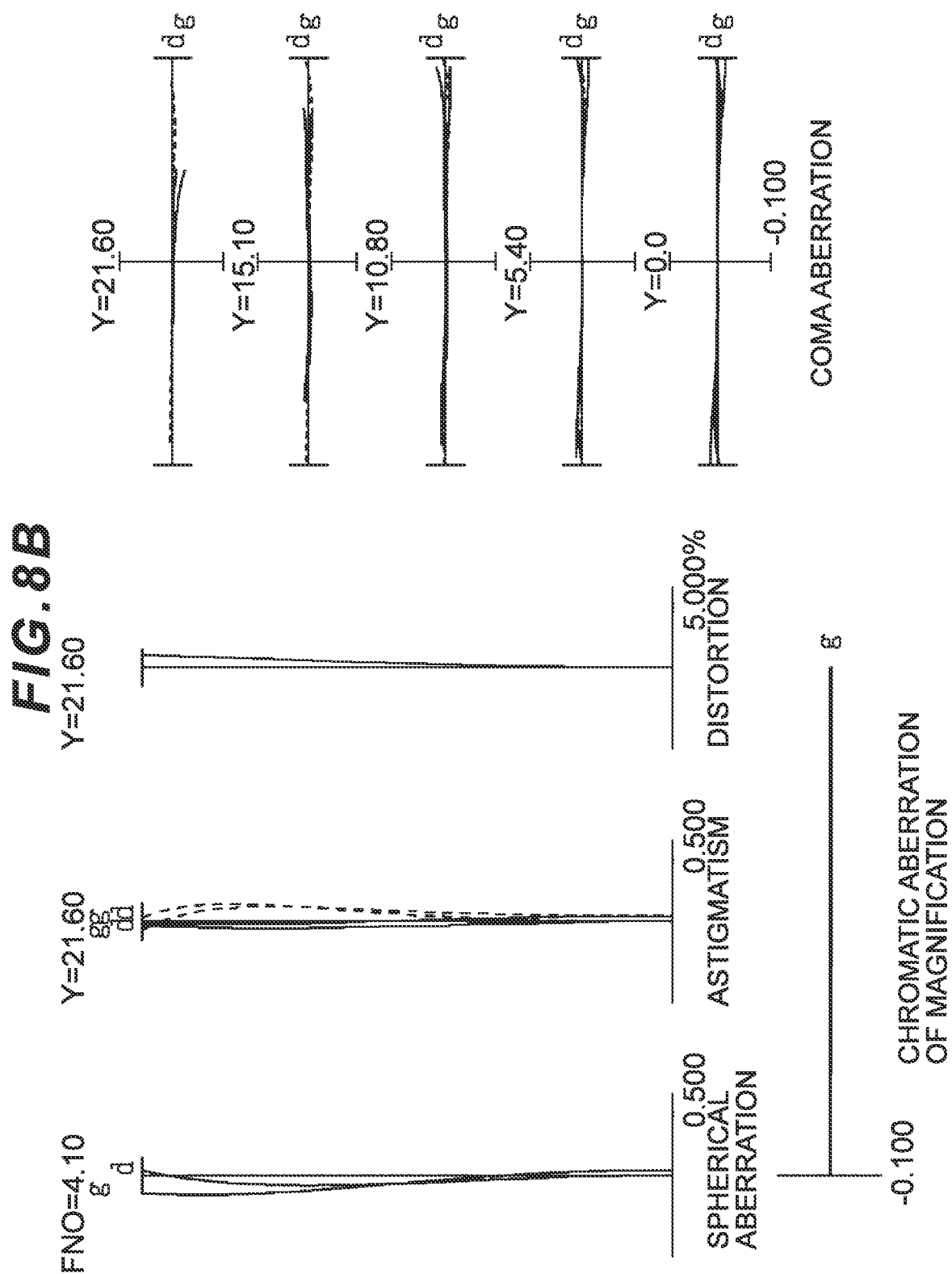
Figure 9A:
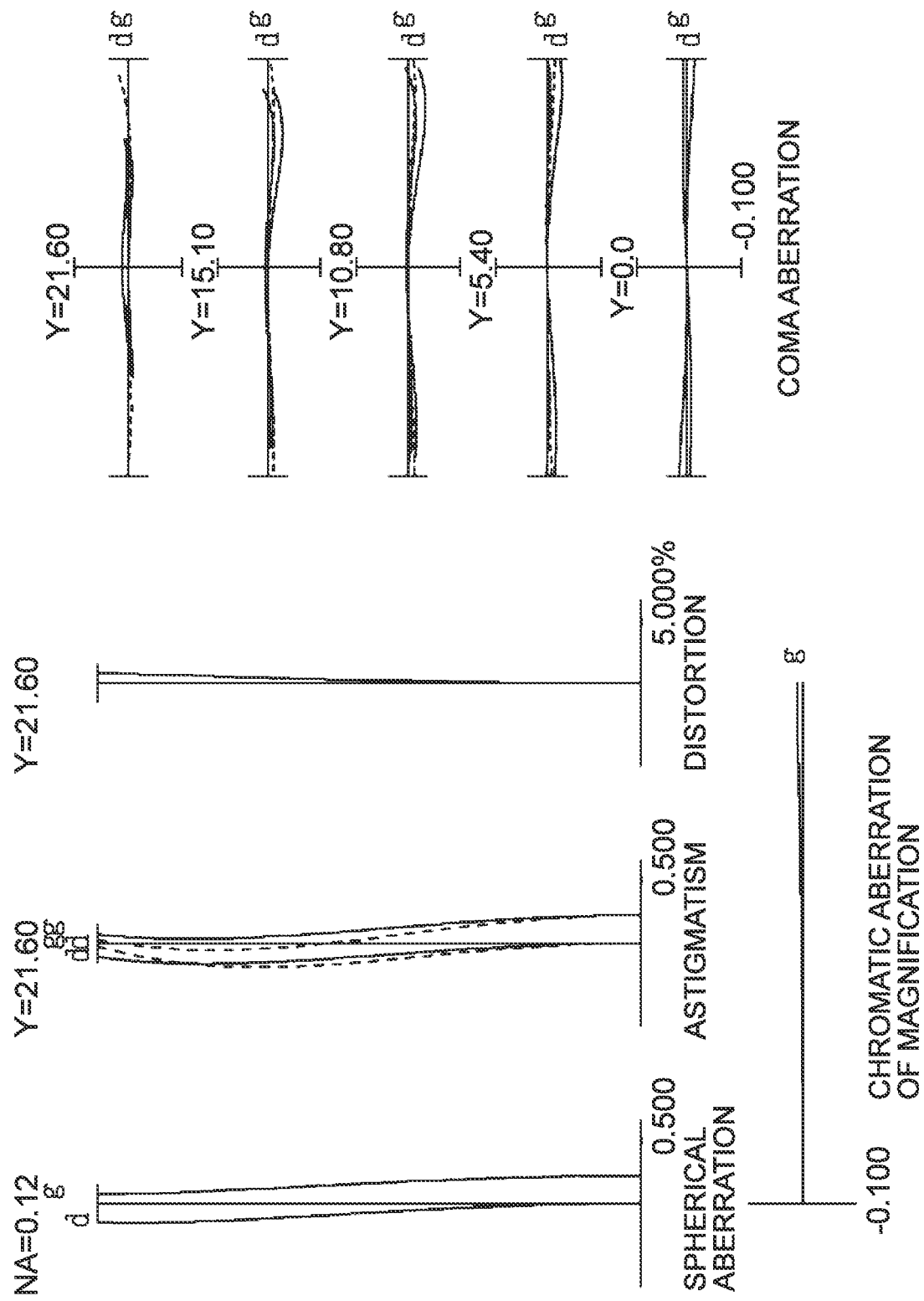

FIGS. 8A-8C show various aberration values of the zoom optical system according to Example 3 in a focusing-on-an-infinity-object state, and FIGS. 9A-9C show various aberration values of the zoom optical system according to Example 3 in a focusing-on-a-close-range-object state. In these diagrams, FIGS. 8A and 9A show various aberration values in a wide-angle end state, FIGS. 8B and 9B show various aberration values in an intermediate focal length state, and FIGS. 8C and 9C show various aberration values in a telephoto end state. From each aberration diagram, it is understood that the zoom optical system according to Example 3 can favorably correct various aberrations in focusing from an infinity object to a short distance object in the entire range from the wide-angle end state to the telephoto end state, thereby effectively suppressing aberration fluctuations.

Example 4

Figure 10:
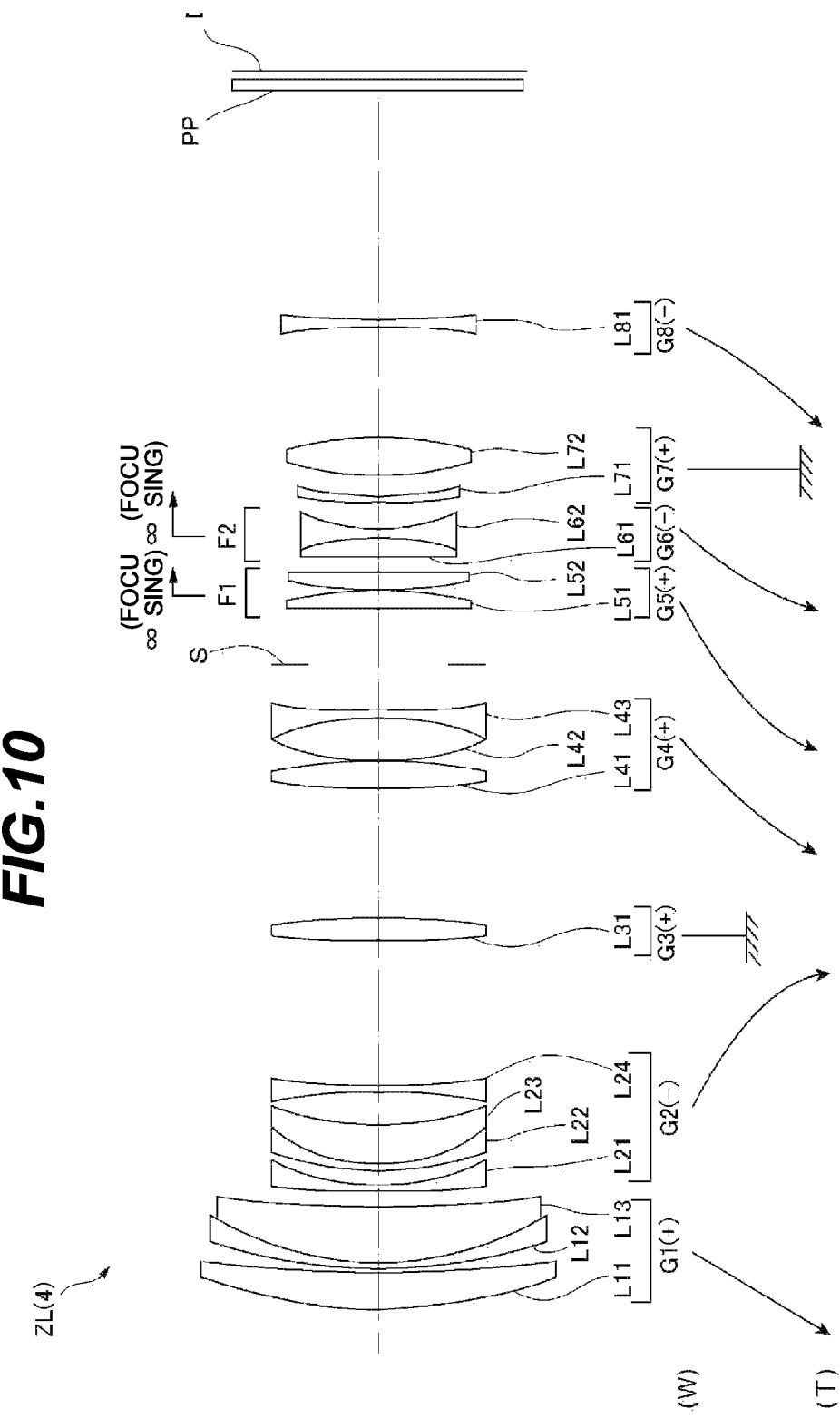
FIG. 10 shows a diagram illustrating a lens configuration of a zoom optical system according to Example 4.

Example 4 will be described using FIGS. 10, 11A-11C, and 12A-12C, and Table 4. FIG. 10 is a diagram showing a lens configuration of a zoom optical system ZL (4) according to Example 4. The zoom optical system ZL (4) includes, in order from the object side, a first lens group G1 having a positive refractive power, a second lens group G2 having a negative refractive power, a third lens group G3 having a positive refractive power, a fourth lens group G4 having a positive refractive power, a fifth lens group G5 having a positive refractive power, an aperture stop S disposed in the fifth lens group G5, a sixth lens group G6 having a negative refractive power, a seventh lens group G7 having a positive refractive power, and an eighth lens group G8 having a negative refractive power. The image surface I is located behind the eighth lens group G8.

The fifth to seventh lens groups have a triplet structure with unevenness, which makes it easy to suppress aberration fluctuations upon zooming. Also, since the eighth lens group having a negative refractive power is disposed behind the seventh lens group, the structure is close to the telephoto structure as a whole, where back focusing and the effect of shortening the entire length of the optical system can be easily obtained. In the present example, the fifth lens group G5 functions as the first focusing lens group F1, and the sixth lens group G6 functions as the second focusing lens group F2. The second focusing lens group also functions as a teleconverter that expands the focal length of the first to fifth lens groups.

The first lens group G1, the second lens group G2, the fourth lens group G4, the fifth lens group G5, the sixth lens group G6, and the eighth lens group G8 move along the trajectories indicated by the arrows shown in the lower part of FIG. 10 upon zooming from the wide-angle end state (W) to the telephoto end state (T). As a result, the distance between the adjacent lens groups changes, and the photographing magnification is changed (zooming is performed). The second lens group G2 is fixed and does not move upon zooming. When focusing from an infinite object to a short distance object, the fifth lens group G5 and the sixth lens group G6 move to the image surface side along different trajectories as shown by the arrows in the upper part of FIG. 10.

The first lens group G1 includes a positive meniscus lens L11 having a convex surface facing the object side, and a cemented positive lens with a negative meniscus lens L12 having a convex surface facing the object side and a positive meniscus lens L13 having a convex surface facing the object side. The second lens group G2 includes a negative meniscus lens L21 having a convex surface facing the object side, a cemented positive lens with a negative meniscus lens L22 having a convex surface facing the object side and a positive meniscus lens L23 having a convex surface facing the object side, and a biconcave negative lens L24. The third lens group G3 includes a biconvex positive lens L31. The fourth lens group G4 includes a biconvex positive lens L41, and a cemented positive lens with a biconvex positive lens L42 and a biconcave negative lens L43.

The fifth lens group G5 includes a positive meniscus lens L51 having a concave surface facing the object side, an aperture stop S, and a biconvex positive lens L52. The sixth lens group G6 includes a cemented negative lens with a positive meniscus lens L61 having a concave surface facing the object side and a biconcave negative lens L62.

The seventh lens group G7 includes a negative meniscus lens L71 having a convex surface facing the object side and a biconvex positive lens L72. The eighth lens group G8 includes a biconcave negative lens L81. Further, a parallel flat plate PP is disposed in front of the image surface I.

Table 4 lists the values of the data of the zoom optical system according to Example 4.

TABLE 4

[General Data]
Zooming ratio = 2.708

|   | W | M | T |
|---|---|---|---|
| f | 72.01 | 131.83 | 195.00 |
| ENO | 4.10 | 4.10 | 4.10 |
| 2ω | 33.18 | 18.31 | 12.41 |
| Ymax | 21.60 | 21.60 | 21.60 |
| TL | 190.10 | 196.42 | 202.79 |
| BF | 37.81 | 43.31 | 52.83 |

[Lens Data]

| Surface Number | R | D | nd | vd |
|---|---|---|---|---|
| Object Surface | ∞ | | | |
| 1 | 79.0842 | 5.95 | 1.4875 | 70.32 |
| 2 | 264.5438 | 0.10 | | |
| 3 | 76.9959 | 1.00 | 1.6200 | 36.40 |
| 4 | 48.0525 | 8.95 | 1.4970 | 81.64 |
| 5 | 237.0010 | (D5) | | |
| 6 | 212.5326 | 1.00 | 1.9537 | 32.32 |
| 7 | 35.1692 | 2.15 | | |
| 8 | 52.5161 | 1.00 | 1.5935 | 67.00 |
| 9 | 25.5276 | 6.40 | 1.9630 | 24.11 |
| 10 | 56.3526 | 4.91 | | |
| 11 | −81.6868 | 1.00 | 1.7550 | 52.32 |
| 12 | 117.0223 | (D12) | | |
| 13 | 229.9072 | 3.32 | 2.0007 | 25.46 |
| 14 | −149.7696 | (D14) | | |
| 15 | 108.7396 | 4.23 | 1.5186 | 69.89 |
| 16 | −81.0701 | 0.10 | | |
| 17 | 44.1054 | 6.79 | 1.4971 | 81.56 |
| 18 | −43.2444 | 1.00 | 1.9229 | 20.88 |
| 19 | 208.7919 | 6.96 | | |
| 20(S) | 0.0000 | (D20) | | |
| 21 | −123.9327 | 2.46 | 2.0027 | 19.32 |
| 22 | −59.8965 | 0.10 | | |
| 23 | 76.0756 | 2.78 | 1.4971 | 81.56 |
| 24 | −9120.5459 | (D24) | | |
| 25 | −400.9124 | 3.38 | 1.7847 | 25.64 |
| 26 | −35.1385 | 1.00 | 1.7440 | 44.90 |
| 27 | 31.1285 | (D27) | | |
| 28 | 86.5286 | 1.00 | 1.8513 | 40.10 |
| 29 | 46.8866 | 3.27 | | |
| 30 | 51.7194 | 5.85 | 1.6976 | 55.51 |
| 31 | −51.0112 | (D31) | | |
| 32 | −83.2716 | 1.00 | 1.7296 | 54.07 |
| 33 | 200.0000 | (D33) | | |
| 34 | 0.0000 | 1.60 | 1.5168 | 63.88 |
| 35 | 0.0000 | 1.00 | | |
| Image Surface | ∞ | | | |

[Lens Group Data]

| Group | First surface | Focal length |
|---|---|---|
| 1 | 1 | 127.643 |
| 2 | 6 | −32.627 |
| 3 | 13 | 91.026 |
| 4 | 15 | 104.204 |
| 5 | 21 | 64.670 |
| 6 | 25 | −40.331 |
| 7 | 28 | 51.908 |
| 8 | 32 | −80.459 |

[Variable Distance Data]

|  | Infinity | | | Close-range | | |
|---|---|---|---|---|---|---|
|  | W | M | T | W | M | T |
| F | 72.100 | 105.000 | 194.000 | 66.728 | 93.257 | 133.735 |
| D5 | 2.000 | 22.798 | 35.000 | 2.000 | 22.798 | 35.000 |
| D12 | 22.209 | 6.752 | 2.000 | 22.209 | 6.752 | 2.000 |
| D14 | 19.979 | 9.878 | 2.100 | 19.979 | 9.878 | 2.100 |
| D20 | 8.931 | 3.262 | 3.460 | 9.340 | 4.223 | 4.748 |
| D24 | 2.155 | 10.230 | 12.617 | 3.818 | 15.216 | 21.949 |
| D27 | 4.073 | 11.769 | 16.961 | 2.000 | 5.820 | 6.341 |
| D31 | 17.106 | 11.180 | 2.000 | 17.106 | 11.181 | 2.000 |
| D33 | 35.348 | 41.260 | 50.363 | 35.442 | 41.365 | 50.363 |

Figure 11C:
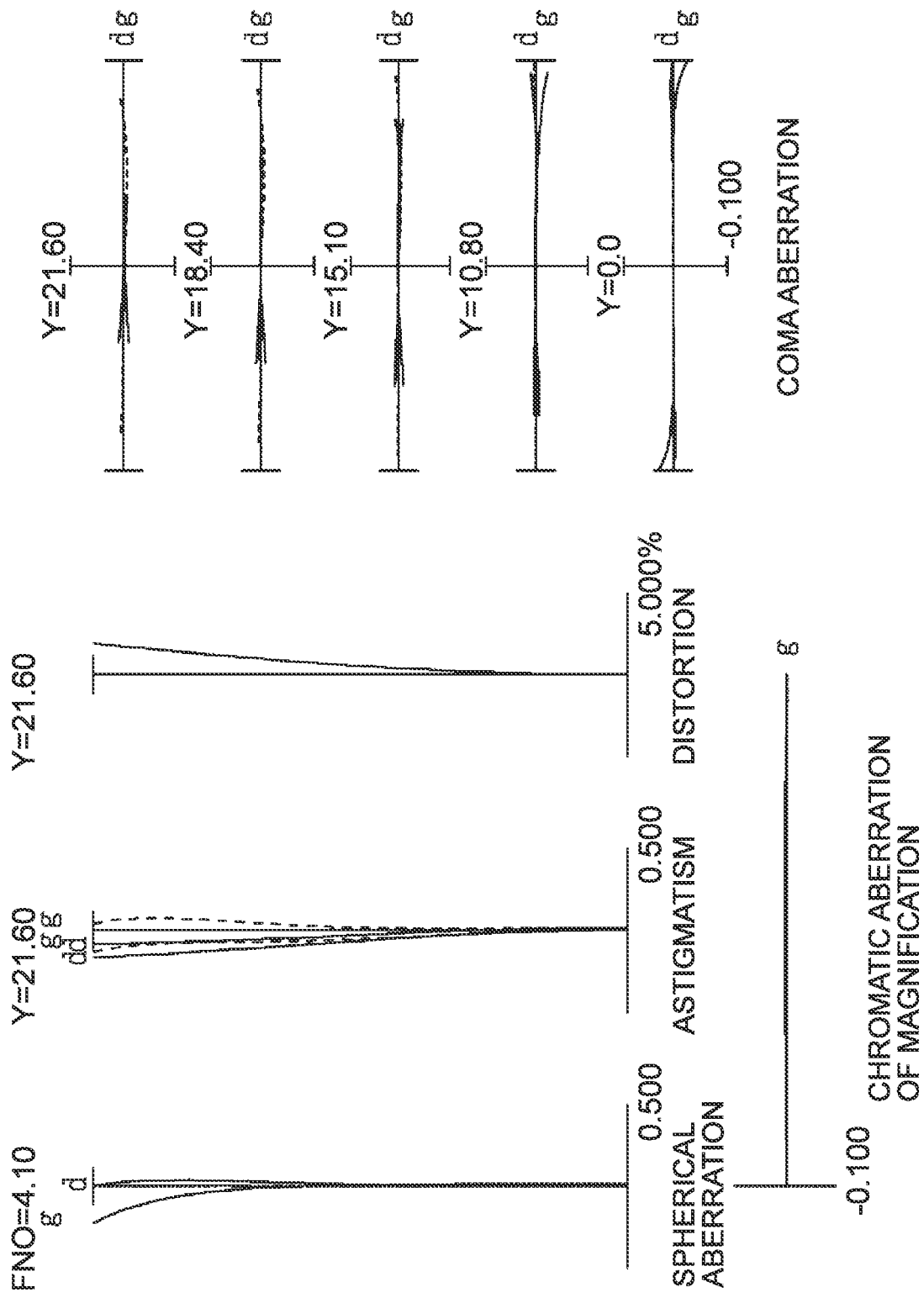
Figure 12C:
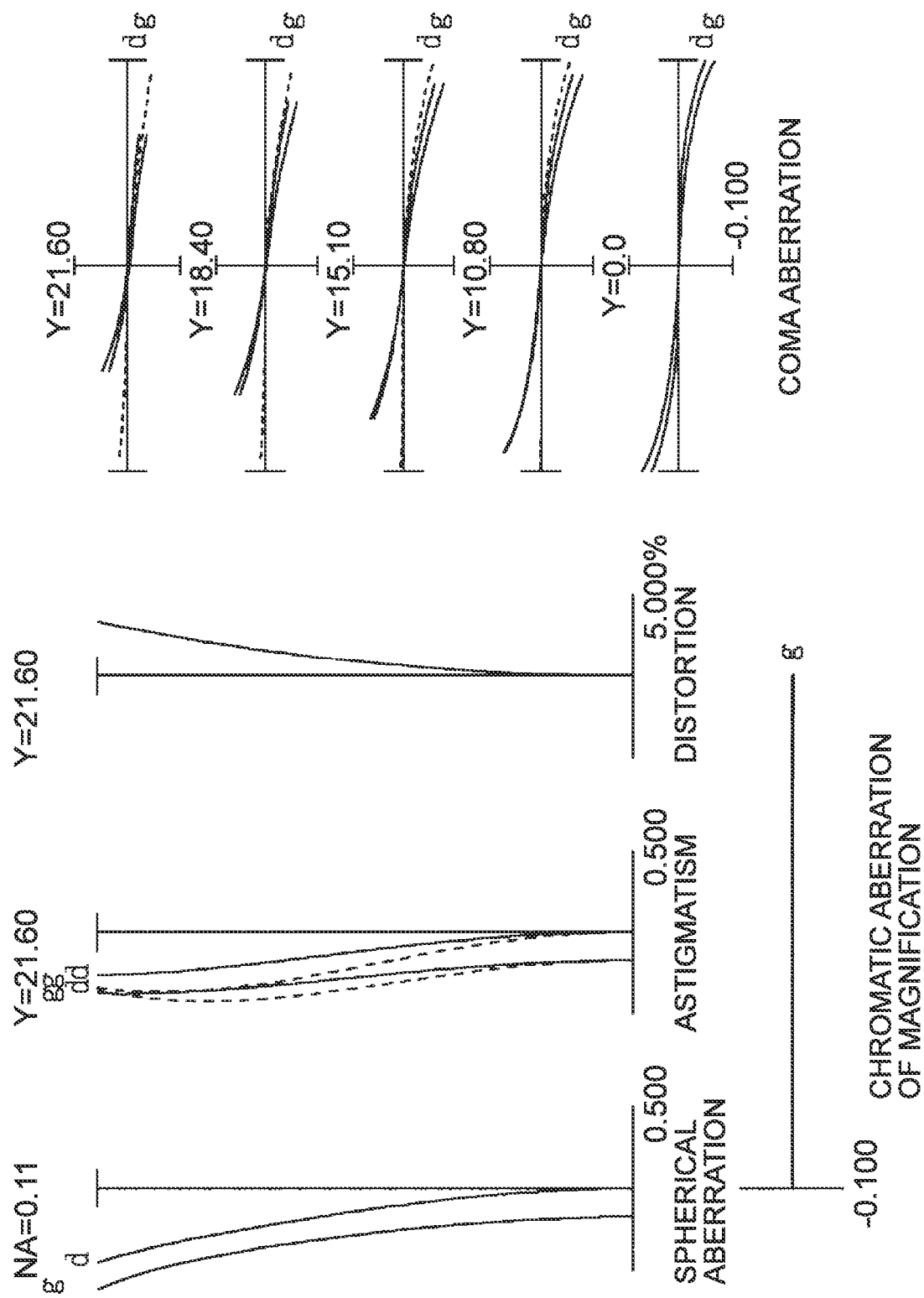

FIGS. 11A-11C show various aberration values of the zoom optical system according to Example 4 in a focusing-on-an-infinity-object state, and FIGS. 12A-12C show various aberration values of the zoom optical system according to Example 4 in a focusing-on-a-close-range-object state. In these diagrams, FIGS. 11A and 12A show various aberration values in a wide-angle end state, FIGS. 11B and 12B show various aberration values in an intermediate focal length state, and FIGS. 11C and 12C show various aberration values in a telephoto end state. From each aberration diagram, it is understood that the zoom optical system according to Example 4 can favorably correct various aberrations upon focusing from an infinity object to a short distance object in the entire range from the wide-angle end state to the telephoto end state, thereby effectively suppressing aberration fluctuations.

The list of conditional expressions and the conditional expression corresponding values of each example are shown below.

[List of Conditional Expressions]

$(-fF2)/ft$     (1)

$vd$     (2)

$NdF2n/NdF2p$     (3)

$MF1t/MF2t$     (4)

$\beta F1t/\beta F2t$     (5)

$\beta F1w/\beta LGw$     (6)

$(-fF2)/fF1$     (7)

$\beta F1$     (8)

$1/\beta F2$     (9)

$\{(\beta F1+(1/\beta F1)\}^{-2}$     (10)

$\{(\beta F2+(1/\beta F2)\}^{-2}$     (11)

$(-f2)/TLw$     (12)

$\Sigma G1/TLw$     (13)

$(-f2)/f3$     (14)

|  | Example 1 | Example 2 | Example 3 | Example 4 |
|---|---|---|---|---|
| (1) | 0.213 | 0.192 | 0.243 | 0.207 |
| (2) | 26.520 | 23.780 | 25.640 | 25.640 |
| (3) | 1.006 | 0.960 | 1.036 | 0.977 |
| (4) | 0.136 | 0.222 | 0.155 | 0.121 |
| (5) | 0.163 | 0.124 | 0.089 | 0.050 |
| (6) | 0.618 | 0.665 | 1.432 | 2.140 |
| (7) | 0.648 | 0.591 | 0.626 | 0.624 |
| (8) | 0.418 | 0.374 | 0.381 | 0.372 |
| (9) | 0.391 | 0.331 | 0.233 | 0.135 |
| (10) | 0.127 | 0.108 | 0.111 | 0.107 |
| (11) | 0.115 | 0.089 | 0.049 | 0.018 |
| (12) | 26.520 | 23.780 | 25.640 | 25.640 |
| (13) | 0.084 | 0.079 | 0.095 | 0.084 |
| (14) | 0.711 | 0.664 | 0.368 | 0.358 |

Note that the present invention is not limited to the foregoing embodiments, and can be appropriately modified as long as the optical performance specified by the description of each claim is not impaired.

For example, although the foregoing examples illustrate the 6-group and 8-group zoom optical systems, the zoom optical systems having other group configurations (for example, a configuration in which a lens or lens group is added to the part closest to the object or image surface in the zoom optical system). Here, the lens group refers to a part having at least one lens separated by an air distance that changes at the time of zooming or focusing.

Regarding the aperture stop, the aperture stop is disposed in the third lens group, the fourth lens group, or the fifth lens group in each of the above examples, but instead of providing the aperture stop as a member, adopting the role of the aperture stop in the lens frame can be taken into consideration.

Furthermore, the lens surface may be spherical, flat or aspherical. The spherical or flat lens surface facilitates lens processing and assembly adjustment, can prevent deterioration of optical performance due to errors in lens processing and assembly adjustment, and reduces deterioration of depiction performance even if the image surface shifts. The aspherical lens surface may be an aspherical surface obtained by grinding, a glass mold aspherical surface formed by molding glass into an aspherical shape, or a composite aspherical surface formed by forming a resin provided on a glass surface into an aspherical shape. In addition, the lens surface may be a diffraction surface, and the lens may be a refractive index distribution type lens (GRIN lens) or a plastic lens. An antireflection film having a high transmittance in a wide wavelength range may be provided on each lens surface in order to reduce flare or ghosting and achieve high-contrast optical performance.

EXPLANATION OF NUMERALS AND CHARACTERS

G1 First lens group
G2 Second lens group
G3 Third lens group
G4 Fourth lens group
G5 Fifth lens group
G6 Sixth lens group
G7 Seventh lens group
G8 Eighth lens group
I Image surface
S Aperture stop

The invention claimed is:

1. A zoom optical system consisting of a preceding lens group and a succeeding lens group that are disposed in order from an object side along an optical axis, wherein
   the succeeding lens group comprises a first focusing lens group and a second focusing lens group disposed on an image surface side of the first focusing lens group and having a negative refractive power,
   upon zooming, a distance between the lens groups adjacent to each other changes,
   upon focusing from an infinity object to a short distance object, a position of the preceding lens group is fixed, and the first focusing lens group and the second focusing lens group move along different trajectories, and
   the following conditional expressions are satisfied:

$0.05<(-fF2)/ft<0.50$ and $0.00<1/\beta F2<0.90$, where
   fF2: Focal length of the second focusing lens group,
   ft: Focal length of the zoom optical system in a telephoto end state, and
   βF2: Lateral magnification of the second focusing lens group upon focusing on an infinity object.

2. A zoom optical system consisting of a preceding lens group and a succeeding lens group that are disposed in order from an object side along an optical axis, wherein
   the preceding lens group comprises, in order from the object side along the optical axis, a first lens group having a positive refractive power and a second lens group having a negative refractive power,
   the succeeding lens group comprises a first focusing lens group and a second focusing lens group disposed on an image surface side of the first focusing lens group and having a negative refractive power,
   upon zooming from a wide-angle end state to a telephoto end state, a distance between the lens groups adjacent to each other changes, and the first focusing lens group and the second focusing lens group move to the object side along different trajectories,
   upon focusing from an infinity object to a short distance object, the first focusing lens group and the second focusing lens group move along different trajectories, and
   the following conditional expression is satisfied:

$0.00<1/\beta F2<0.90$, where
   βF2: Lateral magnification of the second focusing lens group upon focusing on an infinity object.

3. A zoom optical system consisting of a preceding lens group and a succeeding lens group that are disposed in order from an object side along an optical axis, wherein
   the succeeding lens group comprises a first focusing lens group and a second focusing lens group disposed on an image surface side of the first focusing lens group and having a negative refractive power,
   upon zooming, a distance between the lens groups adjacent to each other changes,
   upon focusing from an infinity object to a short distance object, a position of the preceding lens group is fixed, and the first focusing lens group and the second focusing lens group move to the image surface side along different trajectories,
   the second focusing lens group comprises one positive lens and one negative lens disposed side by side in order from the object side, and
   the following conditional expression is satisfied:

$0.00<1/\beta F2<0.90$, where
   βF2: Lateral magnification of the second focusing lens group upon focusing on an infinity object.

4. The zoom optical system according to claim 1, wherein the second focusing lens group comprises one positive lens and one negative lens disposed side by side in order from the object side.

5. The zoom optical system according to claim 3, wherein the following conditional expression is satisfied:

$vd<37.00$, where
vd: Abbe number of the positive lens constituting the second focusing lens group.

6. The zoom optical system according to claim 3, wherein the following conditional expression is satisfied:

$$0.80 < NdF2n/NdF2p < 1.25,$$

where
NdF2n: Refractive index of the negative lens constituting the second focusing lens group with respect to a d-line, and
NdF2p: Refractive index of the positive lens constituting the second focusing lens group with respect to the d-line.

7. The zoom optical system according to claim 1, wherein the following conditional expression is satisfied:

$$0.05 < MF1t/MF2t < 0.40,$$

where
MF1t: Movement amount of the first focusing lens group in a telephoto end state upon focusing from an infinity object to a close-range object, and
MF2t: Movement amount of the second focusing lens group in a telephoto end state upon focusing from an infinity object to a close-range object
(Movement amount is the amount of movement to the image surface side, expressed by a positive value).

8. The zoom optical system according to claim 1, wherein the following conditional expression is satisfied:

$$0.04 < \beta F1t/\beta F2t < 0.20,$$

where
βF1t: Lateral magnification of the first focusing lens group in a telephoto end state upon focusing on an infinity object, and
βF2t: Lateral magnification of the second focusing lens group in a telephoto end state upon focusing on an infinity object.

9. The zoom optical system according to claim 1, further comprising a rear lens group disposed adjacent to the second focusing lens group on an image surface side of the second focusing lens group, wherein the following conditional expression is satisfied:

$$0.05 < \beta F1w/\beta LGW < 2.50,$$

where
βF1w: Lateral magnification of the first focusing lens group in a wide-angle end state upon focusing on an infinity object, and
βLGw: Lateral magnification of the rear lens group in a wide-angle end state upon focusing on an infinity object.

10. The zoom optical system according to claim 1, wherein the following conditional expression is satisfied:

$$0.40 < (-fF2)/fF1 < 0.80,$$

where
fF1: Focal length of the first focusing lens group, and
fF2: Focal length of the second focusing lens group.

11. The zoom optical system according to claim 1, wherein a lens component with a negative refractive power is disposed at a position closest to an image surface of the succeeding lens group.

12. The zoom optical systems according to claim 1, further comprising an aperture stop disposed on the optical axis, wherein the first focusing lens group and the second focusing lens group are disposed closer to the image surface than the aperture stop.

13. The zoom optical systems according to claim 1, wherein the first focusing lens group and the second focusing lens group are disposed adjacent to each other.

14. The zoom optical system according to claim 1, wherein the following conditional expression is satisfied:

$$0.00 < \beta F1 < 0.90,$$

where
βF1: Lateral magnification of the first focusing lens group upon focusing on an infinity object.

15. The zoom optical system according to claim 1, wherein the following conditional expression is satisfied:

$$\{\beta F1 + (1/\beta F1)\}^{-2} < 0.25,$$

where
βF1: Lateral magnification of the first focusing lens group upon focusing on an infinity object.

16. The zoom optical system according to claim 1, wherein the following conditional expression is satisfied:

$$\{\beta F2 + (1/\beta F2)\}^{-2} < 0.25_T.$$

17. The zoom optical system according to claim 1, wherein the preceding lens group comprises, in order from the object side along the optical axis, a first lens group having a positive refractive power, a second lens group having a negative refractive power, and a third lens group having a positive refractive power.

18. The zoom optical system according to claim 17, wherein the following conditional expression is satisfied:

$$0.05 < (-f2)/TLw < 0.30,$$

where
f2: Focal length of the second lens group, and
TLw: Entire length of the zoom optical system in a wide-angle end state upon focusing on an infinity object.

19. The zoom optical system according to claim 17, wherein the following conditional expression is satisfied:

$$0.05 < EG1/TLw < 0.15,$$

where
ΣG1: Distance from an object-side surface of the lens disposed on the object side of the first lens group to an image-surface-side surface of the lens disposed on the image surface side of the first lens group, and
TLw: Entire length of the zoom optical system in a wide-angle end state upon focusing on an infinity object.

20. The zoom optical system according to claim 17, wherein the following conditional expression is satisfied:

$$0.30 < (-f2)/f3 < 0.80,$$

where
f2: Focal length of the second lens group, and
f3: Focal length of the third lens group.

21. An optical apparatus equipped with the zoom optical system according to claim 1.

22. A method for manufacturing the zoom optical system consisting of a preceding lens group and a succeeding lens group disposed in order from an object side along an optical axis,
the method comprising:
arranging the preceding lens group and the succeeding lens group in a lens barrel in order from an object side along an optical axis, and configuring the succeeding lens group to comprise a first focusing lens group and a second focusing lens group disposed on an image surface side of the first focusing lens group and having a negative refractive power, the method further comprising one of the following features A, B and C, wherein the feature A including:

upon zooming, changing a distance between the lens groups adjacent to each other, upon focusing from an infinity object to a short distance object, keeping the position of the preceding lens group fixed, and moving the first focusing lens group and the second focusing lens group along different trajectories, and satisfying the following conditional expressions:

$$0.05<(-fF2)/ft<0.50 \text{ and}$$

$$0.00<1/\beta F2<0.90,$$

where fF2: Focal length of the second focusing lens group, ft: Focal length of the zoom optical system in a telephoto end state, and βF2: Lateral magnification of the second focusing lens group upon focusing on an infinity object, the feature B including:

configuring the preceding lens group to comprise, in order from the object side along the optical axis, a first lens group having a positive refractive power and a second lens group having a negative refractive power, upon zooming from a wide-angle end state to a telephoto end state, changing a distance between the lens groups adjacent to each other, and moving the first focusing lens group and the second focusing lens group to the object side along different trajectories, upon focusing from an infinity object to a short distance object, moving the first focusing lens group and the second focusing lens group along different trajectories, and satisfying the following conditional expression:

$$0.00<1/\beta F2<0.90,$$

where

βF2: Lateral magnification of the second focusing lens group upon focusing on an infinity object, and the feature C including:

upon zooming, changing a distance between the lens groups adjacent to each other, upon focusing from an infinity object to a short distance object, keeping a position of the preceding lens group fixed, and moving the first focusing lens group and the second focusing lens group to the image surface side along different trajectories, configuring the second focusing lens group to comprise one positive lens and one negative lens disposed side by side in order from the object side, and satisfying the following conditional expression:

$$0.00<1/\beta F2<0.90,$$

where

βF2: Lateral magnification of the second focusing lens group upon focusing on an infinity object.

* * * * *